United States Patent [19]
Furukawa et al.

[11] Patent Number: 6,032,270
[45] Date of Patent: Feb. 29, 2000

[54] DATA PROCESSOR TESTING APPARATUS AND A DATA PROCESSOR TESTING METHOD

[75] Inventors: Takeshi Furukawa; Shinichi Nakamura, both of Kanagawa, Japan

[73] Assignee: Fujitsu Limited, Kawasaki, Japan

[21] Appl. No.: 09/027,718

[22] Filed: Feb. 23, 1998

[30] Foreign Application Priority Data

Jul. 28, 1997 [JP] Japan .................................. 9-201907

[51] Int. Cl.$^7$ .................................................. G06F 11/00
[52] U.S. Cl. ........................................ 714/49; 395/500.05
[58] Field of Search .................................. 714/49, 50, 51, 714/52, 48, 40, 41, 37, 39, 32, 33, 25, 42; 395/500.1, 500.01–500.09, 500.34

[56] References Cited

U.S. PATENT DOCUMENTS

| | | | |
|---|---|---|---|
| 5,673,425 | 9/1997 | Iwashita | 395/568 |
| 5,708,594 | 1/1998 | Iwashita et al. | 364/578 |
| 5,748,879 | 5/1998 | Kobayashi | 395/183.18 |
| 5,761,521 | 6/1998 | Chilinski et al. | 395/800.01 |
| 5,838,897 | 11/1998 | Bluhm et al. | 395/183.06 |
| 5,841,960 | 11/1998 | Ibusuki et al. | 395/183.08 |

*Primary Examiner*—Robert W. Beausoliel, Jr.
*Assistant Examiner*—Nadeem Iqbal
*Attorney, Agent, or Firm*—Staas & Halsey LLP

[57] ABSTRACT

A data processor testing apparatus, in which, in an access instruction executing section, an instruction string to be tested for access to cache memories as an object for execution is previously prepared, access data on a memory is set in an instruction cache memory and operand cache memory according to the instruction string to be tested, and in a BI control section, the access data set as described above is invalidated with the BI signal when the access data set in the operand cache memory is data for an address previously decided as an object for invalidation on the memory, and determination is made by a comparison control section as to whether a result of invalidation is acceptable or not.

17 Claims, 15 Drawing Sheets

DATA PROCESSOR TESTING APPARATUS AND A DATA PROCESSOR TESTING METHOD

FIELD OF THE INVENTION

The present invention relates to a data processor testing apparatus for executing a block invalidation (BI) test such as a test on a normal operation of the block invalidation to a block invalidated (BI) signal as well as on bad influence to a CPU when a BI signal is generated in an access conflict test to the identical memory area, as well as to a data processor testing method.

BACKGROUND OF THE INVENTION

Conventionally, in this type of data processor testing apparatus, access data set in a cache memory or the like is generally invalidated (BI) by access made through an external unit such as an I/O.

FIG. 15 is a block diagram showing a data processor testing apparatus according to an example based on the conventional technology. The testing apparatus for a data processor shown in FIG. 15 comprises a CPU 81, an intermediate buffer 84, a memory 85 for storing therein data, and an external input/output mechanism 86 which is an external unit. It is assumed that this data processor testing apparatus, which is not shown in the figure, has a memory for a program required for executing the BI test.

The CPU 81 has an instruction cache memory 82, an operand cache memory 83 and an instruction control section 87, and controls the BI test on the whole using the instruction control section 87. The instruction control section 87 comprises an access instruction executing section 87A for executing an access instruction and a comparison control section 87B for comparing an expected value to a result of executing the BI test. The access instruction executing section 87A comprises an initialization control section 871 for initializing for a BI test for testing access data, an instruction string to be tested 872 indicating a sequence of the BI test, and an external input/output initiating section 873 for initiating input/output of the external I/O mechanism 86.

Connected to both the instruction cache memory 82 and the operand cache memory 83 are the instruction string to be tested 872 and the intermediate buffer 84 respectively, and an instruction and an operand are set in the cache memories via the intermediate buffer 84 by execution of the instruction string to be tested 872 respectively. Connected to the external I/O mechanism 86 are the external I/O initiating section 873 and the memory 85, and data is transmitted to and received from the memory 85 according to initiation for input/output from the external I/O control section 86. The intermediate buffer 84 is connected to the memory 85 and stores therein any instruction and operand read out therefrom by memory control.

Next description is made for operations of the data processor testing apparatus. In the data processor testing apparatus shown in FIG. 15, at first, in the access instruction executing section 87A, initialization is executed by the initialization control section 871, and then the instruction string to be tested 872 is executed. With the execution of this instruction string to be tested 872, the instruction and operand stored in the memory 85 are stored in the instruction cache memory 82 and operand cache memory 83 respectively via the intermediate buffer 84.

Further, when the external I/O mechanism 86 is initiated by the external I/O initiating section 873, the memory 85 is accessed by the external I/O mechanism 86. In this case, when an address of access from the external I/O mechanism 86 and an address of access by the instruction string to be tested 872 are in the same memory area, BI signals are issued, as shown in FIG. 15, from the memory 85 to the instruction cache memory 82, operand cache memory 83, and to the intermediate buffer 84 in order to match the access data (instruction data, operand data). The access data is invalidated by means of the BI signals in the instruction cache memory 82, operand cache memory 83, and intermediate buffer 84.

Then determination is made in the instruction control section 87 as to whether a result of the BI test is acceptable or not by comparing a result of execution of the instruction string to be tested 872 to a preset expected value in the comparison control section 87B. Then, the control shifts to the access instruction executing section 87A and the BI test is repeatedly executed.

In the conventional type of BI test, correlation among the instruction cache memory, operand cache memory and intermediate buffer is not clearly understood unless the external unit is connected to the apparatus for each verification form (logic verification, board verification, and actual machine verification), so that it is naturally required to construct a large verification system. However, because of restriction in the scale of logic simulation, there are some cases where verification can not be executed for some reasons such that all the circuits required for the verification system can not be embedded in an board or an external unit can not logically be connected to the apparatus. And for this reason, there occurs the necessity of executing again the entire test right from the beginning, which causes the work efficiency to get worse.

SUMMARY OF THE INVENTION

It is an object to obtain a data processor testing apparatus and a data processor testing method in which work efficiency of the test on the whole can be improved, without any support by an external unit, by making verification even in such an earlier stage in which a smaller scale of logic simulation is performed.

With the present invention, access data on a first memory is read out and stored on a second memory according to the instruction string to be tested, the access data stored on the second memory is invalidated when the access data stored on the second memory is decided as an object for invalidation according to a certain rule or arbitrarily, and determination is made as to whether a result of the invalidation is acceptable or not, so that verification can be executed even in such an earlier stage in which a smaller scale of logic simulation is performed without any support by an external unit, which allows work efficiency of the test on the whole to be improved.

With the present invention, an instruction string to be tested for access to cache memories as an object for execution is previously prepared, access data on the memory is set in the instruction cache memory and operand cache memory according to the instruction string to be tested, the access data set as described above is invalidated when the access data set in the operand cache memory is data for an address previously decided as an object for invalidation on the memory, and determination is made as to whether a result of invalidation is acceptable or not, so that, when the operand cache memory is decided to be a target for invalidation, verification can be executed even in such an earlier stage in which a smaller scale of logic simulation is performed without any support by an external unit, which allows work efficiency of the test on the whole to be improved.

With the present invention, an instruction string to be tested for access to cache memories as an object for execution is previously prepared, access data on the memory is set in the instruction cache memory and operand cache memory according to the instruction string to be tested, the access data set as described above is invalidated when the access data set in the instruction cache memory is data for an address previously decided as an object for invalidation on the memory, and determination is made as to whether a result of invalidation is acceptable or not, so that, when the instruction cache memory is decided to be a target for invalidation, verification can be executed even in such an earlier stage in which a smaller scale of logic simulation is performed without any support by an external unit, which allows work efficiency of the test on the whole to be improved.

With the present invention, an instruction string to be tested for access to a buffer as an object for execution is previously prepared, access data on the memory is set in an intermediate buffer according to the instruction string to be tested, the access data set as described above is invalidated when the access data set in the intermediate buffer is data for an address previously decided as an object for invalidation on the memory, and determination is made as to whether a result of invalidation is acceptable or not, so that, when the intermediate buffer is decided to be a target for invalidation, verification can be executed even in such an earlier stage in which a smaller scale of logic simulation is performed without any support by an external unit, which allows work efficiency of the test on the whole to be improved.

With the present invention, an instruction string to be tested for access to cache memories as well as to a buffer as an object for execution is previously prepared, access data on the memory is set in an instruction cache memory, an operand cache memory and an intermediate buffer according to the instruction string to be tested, the set access data is invalidated when the set access data is data for an address decided as an object for invalidation on the memory according to a certain rule or arbitrarily, and determination is made as to whether a result of invalidation is acceptable or not, so that, when the instruction cache memory, operand cache memory, and intermediate buffer are set to be targets for invalidation using a certain or arbitrary address, verification can be executed even in such an earlier stage in which a smaller scale of logic simulation is performed without any support by an external unit, which allows work efficiency of the test on the whole to be improved.

With the present invention, an instruction string to be tested for access to cache memories as well as to a buffer as an object for execution is previously prepared, access data on the memory is set in an instruction cache memory, an operand cache memory and an intermediate buffer according to the instruction string to be tested, the set access data is invalidated when the access data set in the instruction cache memory, operand cache memory and intermediate buffer is data for an address previously decided as an object for invalidation on the memory at the timing decided according to a certain rule or arbitrarily, and determination is made as to whether a result of invalidation is acceptable or not, so that, when the instruction cache memory, operand cache memory and intermediate buffer are decided to be targets for invalidation using a certain or an arbitrary timing, verification can be executed even in such an earlier stage in which a smaller scale of logic simulation is performed without any support by an external unit, which allows work efficiency of the test on the whole to be improved.

With the present invention, an instruction string to be tested for access to cache memories as well as to a buffer as an object for execution is previously prepared, access data on the memory is set in an instruction cache memory, an operand cache memory and an intermediate buffer according to the instruction string to be tested, the set access data is invalidated when the access data set in the instruction cache memory, operand cache memory and intermediate buffer is data for an address decided as an object for invalidation on the memory according to a certain rule or arbitrarily at the timing decided according to a certain rule or arbitrarily, and determination is made as to whether a result of invalidation is acceptable or not, so that, when the instruction cache memory, operand cache memory and intermediate buffer are decided to be targets for invalidation using a certain or arbitrary address and a certain or arbitrary timing, verification can be executed even in such an earlier stage in which a smaller scale of logic simulation is performed without any support by an external unit, which allows work efficiency of the test on the whole to be improved.

With the present invention, the memory is accessed at the initial state, access data is set in the intermediate buffer, instruction cache memory and operand cache memory, and an instruction string to be tested for access to the instruction cache memory, operand cache memory and intermediate buffer as an object for execution is previously prepared in the state where the instruction cache memory and operand cache memory have been separated from the intermediate buffer, the memory is accessed according to the instruction string to be tested, access data on the memory is set in the intermediate buffer, the access data set in the instruction cache memory, operand cache memory and intermediate buffer respectively is invalidated when the access data initialized in the instruction cache memory as well as in the operand cache memory and the access data set in the intermediate buffer with the instruction string to be tested are data for an address decided as an object for invalidation on the memory according to a certain rule or arbitrarily, and determination is made as to whether a result of invalidation is acceptable or not, so that, when the instruction cache memory, operand cache memory and intermediate buffer are decided to be targets for invalidation and even if the invalidation is incapable of execution by the side of cache memories, verification can be executed even in such an earlier stage in which a smaller scale of logic simulation is performed without any support by an external unit, which allows work efficiency of the test on the whole to be improved.

With the present invention, a result of determination that invalidation was executed normally is obtained when a result of invalidation is coincident to an expected value previously prepared, and also a result of determination that invalidation was executed abnormally is obtained when the result of invalidation is not coincident to the expected value, so that the same test result as that obtained in a case where the test is executed with support by an external unit can simulatedly be obtained.

With the present invention, the method comprises the steps of reading out access data on a first memory according to an instruction string to be tested, storing the data on a second memory, invalidating the access data stored on the second memory when the stored access data is decided as an object for invalidation according to a certain rule or arbitrarily, and determining whether a result of invalidation is acceptable or not, so that verification can be executed even in such an earlier stage in which a smaller scale of logic simulation is performed without any support by an external unit, which allows work efficiency of the test on the whole to be improved.

Other objects and features of this invention will become understood from the following description with reference to the accompanying drawings.

DESCRIPTION OF THE PREFERRED DRAWINGS

DESCRIPTION OF THE PREFERRED EMBODIMENTS

Detailed description is made hereinafter for preferred embodiments of the data processor testing apparatus and the data processor testing method according to the present invention with reference to the related drawings.

Figure 1:
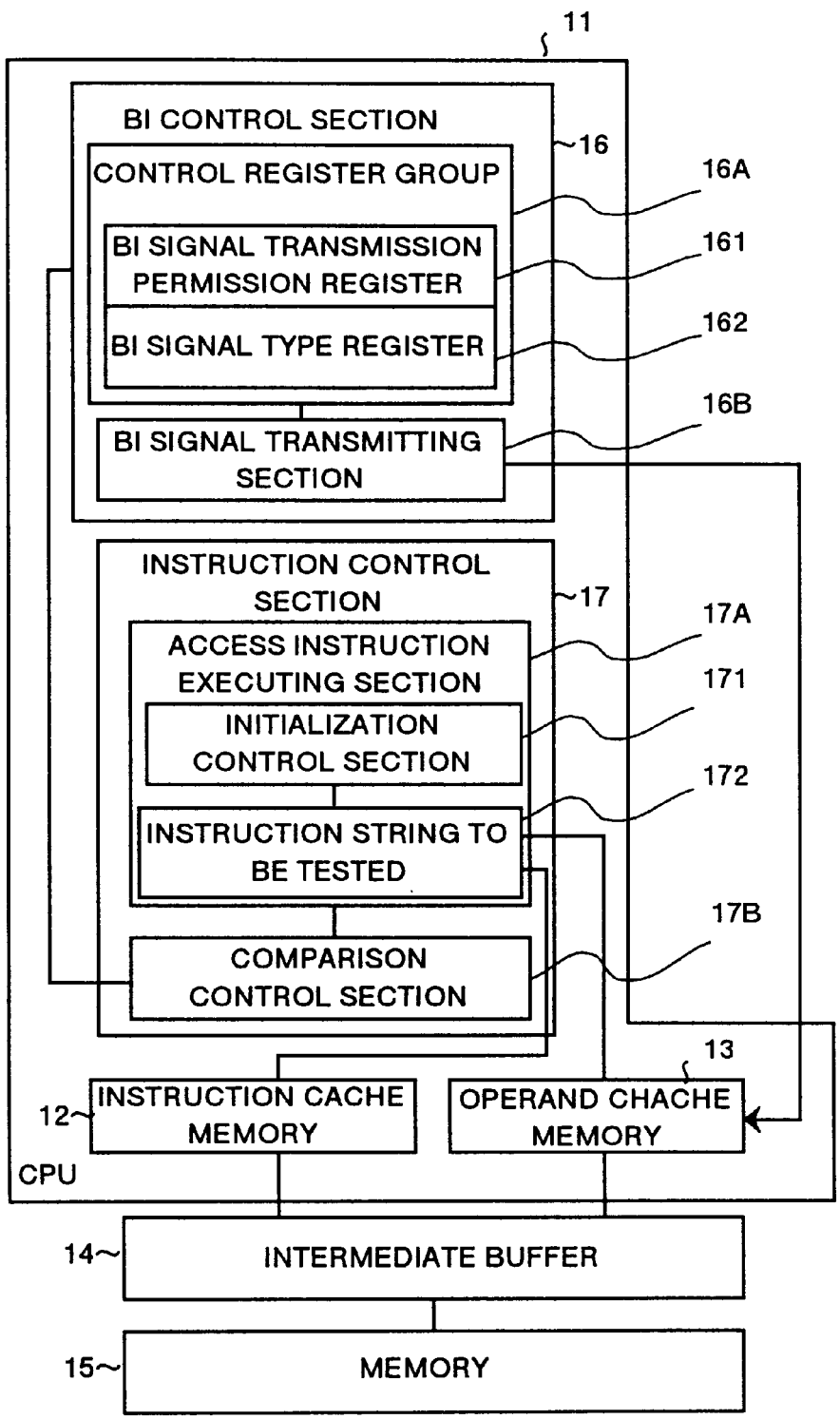
FIG. 1 is a block diagram showing a data processor testing apparatus according to Embodiment 1 of the present invention.

At first description is made for configuration of an apparatus. FIG. 1 is a block diagram showing a data processor testing apparatus according to Embodiment 1 of the present invention. The data processor testing apparatus shown in FIG. 1 comprises a CPU 11, an intermediate buffer 14, and a memory 15 for storing therein data. It is assumed that this data processor testing apparatus has a memory for a program required for executing a BI test, which is not shown in the figure.

The CPU 11 has an instruction cache memory 12 for storing therein instruction data (access data), an operand cache memory 13 for storing therein operand data (access data), a BI control section 16 for controlling BI signal transmission, and an instruction control section 17 for controlling the entire BI test or the like. The BI control section 16 has a control register group 16A comprising a BI signal transmission permission register 161 and a BI signal type register 162, and a BI signal transmitting section 16B.

In the control register group 16A, the BI signal transmission permission register 161 stores therein data for permitting input of a BI signal to a cache memory namely to the operand cache memory 13 as a target for BI control. The BI signal type register 162 stores therein data for instructing a type of the cache to which a BI signal is transmitted (this case indicates the operand cache memory 13). The BI signal transmitting section 16B connected to the operand cache memory 13 generates a BI signal according to data set in the control register group 16A, and executes the processing for transmitting the BI signal to the operand cache memory 13 as a target. The instruction control section 17 comprises an access instruction executing section 17A for executing an instruction for access and a comparison control section 17B for comparing an expected value to a result of executing a BI test. The access instruction executing section 17A comprises an initialization control section 171 for initializing for a BI test with which access data is tested, and an instruction string to be tested 172 indicating a sequence of the BI test.

Connected to both the instruction cache memory 12 and the operand cache memory 13 are the instruction string to be tested 172 and the intermediate buffer 14 respectively, and an instruction and an operand are cached via the intermediate buffer 14 by execution of the instruction string to be tested 172 respectively. The intermediate buffer 14 is connected to the instruction cache memory 12, operand cache memory 13, and the memory 15, and stores therein any instruction and operand read out from the memory 15 by the memory control as access data, outputs instruction data to the instruction cache memory 12, and also outputs operand data to the operand cache memory 13.

Figure 2:
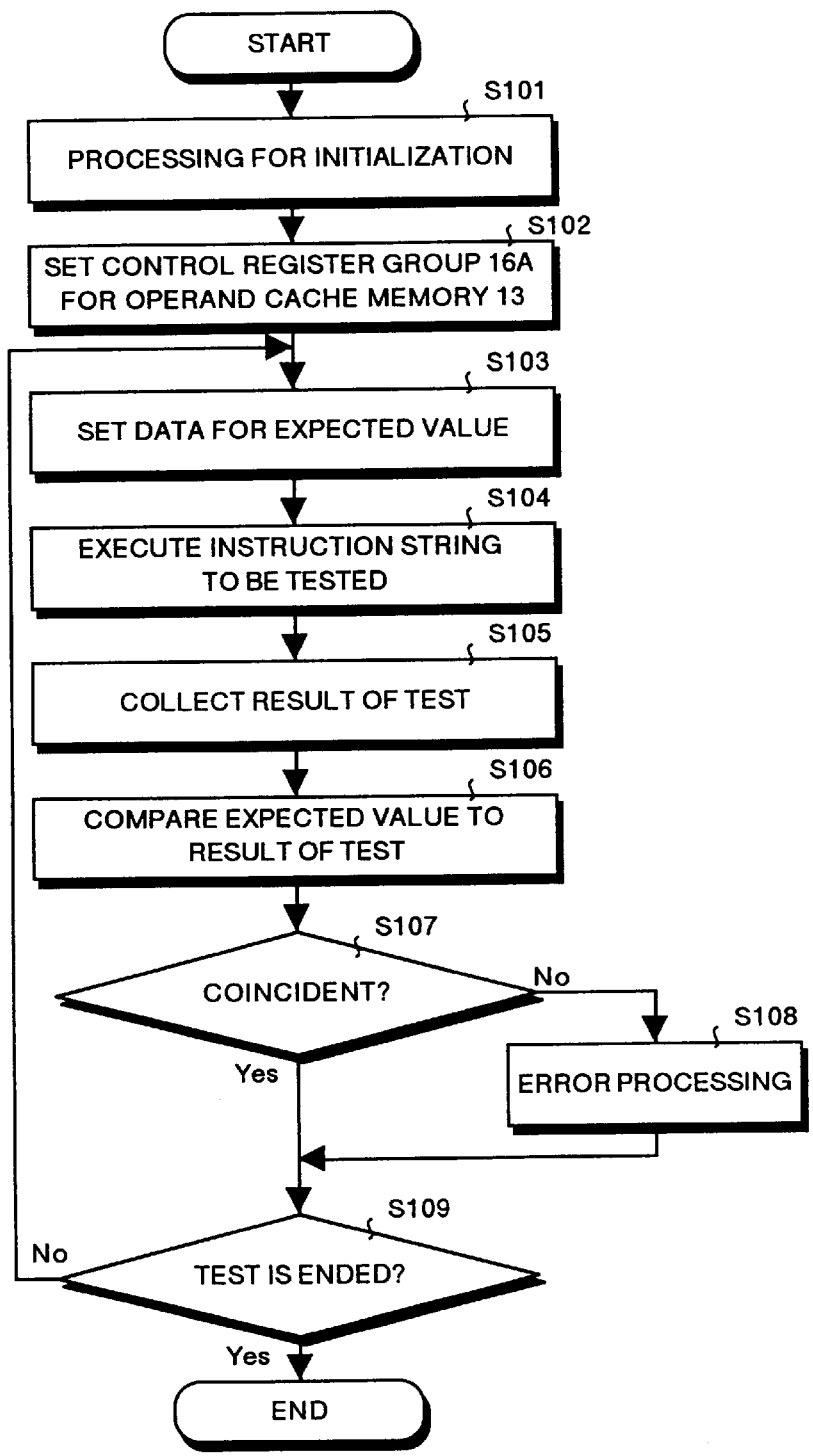
FIG. 2 is a flow chart for explaining operations of the apparatus according to Embodiment 1 of the present invention.

Next description is made for operations of the apparatus having the configuration as described above. FIG. 2 is a flow chart for explaining the operations of the apparatus according to Embodiment 1 of the present invention. At first, in the instruction control section 17, minimum initialization required for operation in the BI test is executed by the access instruction executing section 17A (step S101). At that time, an instruction string to be tested 172 is set therein. Then, in the BI control section 16, setting of the control register group 16A for BI control to the operand cache memory 13 as a target is executed (step S102). Namely, in the control register group 16A, instruction data for permitting input of a BI signal to the operand cache memory 13 is stored in the BI signal transmission permission register 161, and type data indicating a type of the operand cache memory 13 to which the BI signal is transmitted is stored in the BI signal type register 162.

Then, in the instruction control section 17, data for an expected value expected in the BI test is set in the comparison control section 17B (step S103), and the instruction string to be tested 172 having been set is executed (step S104). With the execution of the instruction string to be tested 172, the instruction and operand stored in the memory 15 are stored in the instruction cache memory 12 and operand cache memory 13 respectively via the intermediate buffer 14. In this case, in the BI control section 16, the BI signal transmitting section 16B issues BI signals many times to the operand cache memory 13 because the operand cache memory 13 is selected as a target. This BI signal is a signal for invalidation to certain access data on the memory 15.

Of the access data read out from the memory 15 by executing the instruction string to be tested 172, data for an instruction is set in the instruction cache memory 12 and data for an operand is set in the operand cache memory 13 each via the intermediate buffer 14. When the BI signal is outputted to the operand cache memory 13 and if the access data on the memory 15 set as an object for invalidation in the BI signal is access data set in the operand cache memory 13 by execution of the instruction string to be tested 172, the access data set in the operand cache memory 13 is invalidated (BI). After executing the invalidation, a result of the test according to BI control is collected to the comparison control section 17B (step S105), and comparison is made between the result of the test and the expected value (step S106).

As a result, when it is found that they are coincident to each other (step S107) and the test is continued (step S109), the processing returns again to step S103 to execute the next step to the instruction string to be tested 172, but when it is found that they are not coincident to each other (step S107), error processing is executed using an informing unit such as a display (step S108), which is not shown in the figure, and when the test is continued, the processing returns again to step S103 (step S109) The operations from step S103 to step S108 are repeatedly executed until the test is ended (step S109).

As described above, with Embodiment 1, in the access instruction executing section 17A, an instruction string to be tested 172 for access to cache memories as an object for execution is previously prepared, access data on the memory 15 is set in the instruction cache memory 12 and operand cache memory 13 according to the instruction string to be tested 172, and in the BI control section 16, the access data set as described above is invalidated with the BI signal when the access data set in the operand cache memory 13 is data for an address previously decided as an object for invalidation on the memory 15, and determination is made by the comparison control section 17B as to whether a result of invalidation is acceptable or not, so that, when the operand cache memory 13 is decided to be a target for invalidation, verification can be executed even in such an earlier stage in which a smaller scale of logic simulation is performed without any support by an external unit, which allows work efficiency of the test on the whole to be improved.

In addition, only by setting an address of a BI signal to be transmitted to the operand cache memory 13, a result of determination that invalidation was executed normally is obtained when a result of BI processing is coincident to an expected value previously prepared, and also a result of determination that invalidation was executed abnormally is obtained when the result of invalidation is not coincident to the expected value, so that the same test result as that obtained in the case where the test is executed with support by an external unit can simulatedly be obtained.

In Embodiment 1, the operand cache memory is targeted for the BI processing, but the instruction cache memory may be targeted for the BI processing as in Embodiment 2 described below.

Figure 3:
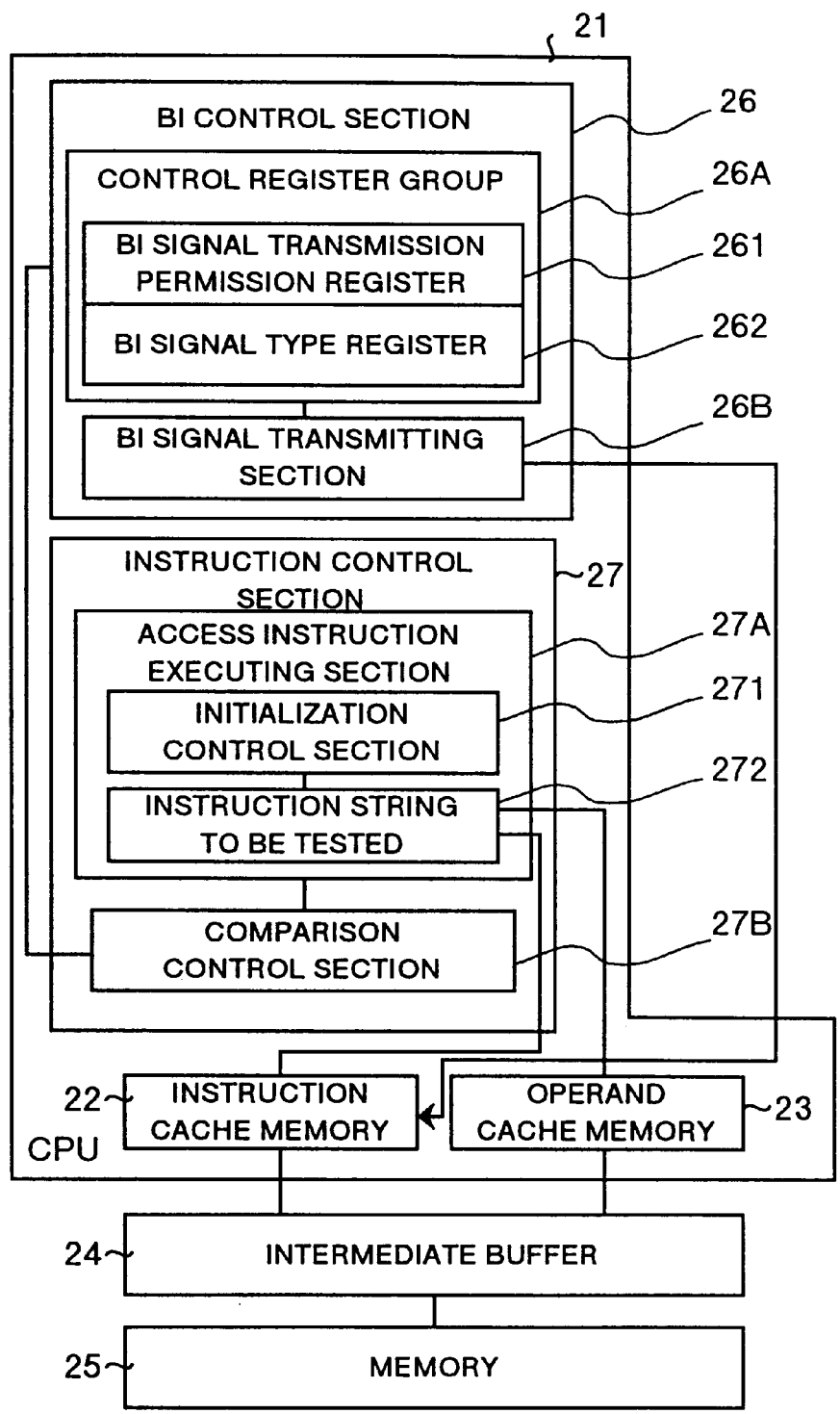
FIG. 3 is a block diagram showing a data processor testing apparatus according to Embodiment 2 of the present invention.

At first description is made for configuration of an apparatus. FIG. 3 is a block diagram showing a data processor testing apparatus according to Embodiment 2 of the present invention. The data processor testing apparatus shown in FIG. 3 comprises a CPU 21, an intermediate buffer 24, and a memory 25 for storing therein data. It is assumed that this data processor testing apparatus has a memory for a program required for executing a BI test, which is not shown in the figure.

The CPU 21 has an instruction cache memory 22 for storing therein instruction data (access data), an operand cache memory 23 for storing therein operand data (access data), a BI control section 26 for controlling BI signal transmission, and an instruction control section 27 for controlling the entire BI test or the like. The BI control section 26 has a control register group 26A comprising a BI signal transmission permission register 261 and a BI signal type register 262, and a BI signal transmitting section 26B.

In the control register group 26A, the BI signal transmission permission register 261 stores therein data for permitting input of a BI signal to a cache memory namely to the instruction cache memory 22 as a target for BI control. The BI signal type register 262 stores therein data for instructing a type of the cache memory to which a BI signal is transmitted (this case indicates the instruction cache memory 22). The BI signal transmitting section 26B connected to the instruction cache memory 22 generates a BI signal according to data set in the control register group 26A, and executes the processing for transmitting the BI signal to the instruction cache memory 22 as a target.

The instruction control section 27 comprises an access instruction executing section 27A for executing an instruction for access and a comparison control section 27B for comparing an expected value to a result of executing a BI test. The access instruction executing section 27A comprises an initialization control section 271 for initializing for a BI test with which access data is tested, and an instruction string to be tested 272 indicating a sequence of the BI test.

Connected to both the instruction cache memory 22 and the operand cache memory 23 are the instruction string to be tested 272 and the intermediate buffer 24 respectively, and an instruction and an operand are cached via the intermediate buffer 24 by execution of the instruction string to be tested 272 respectively. The intermediate buffer 24 is connected to the instruction cache memory 22, operand cache memory 23, and the memory 25, and stores therein any instruction and operand read out from the memory 25 by memory control as access data, outputs instruction data to the instruction cache memory 22, and also outputs operand data to the operand cache memory 23.

Figure 4:
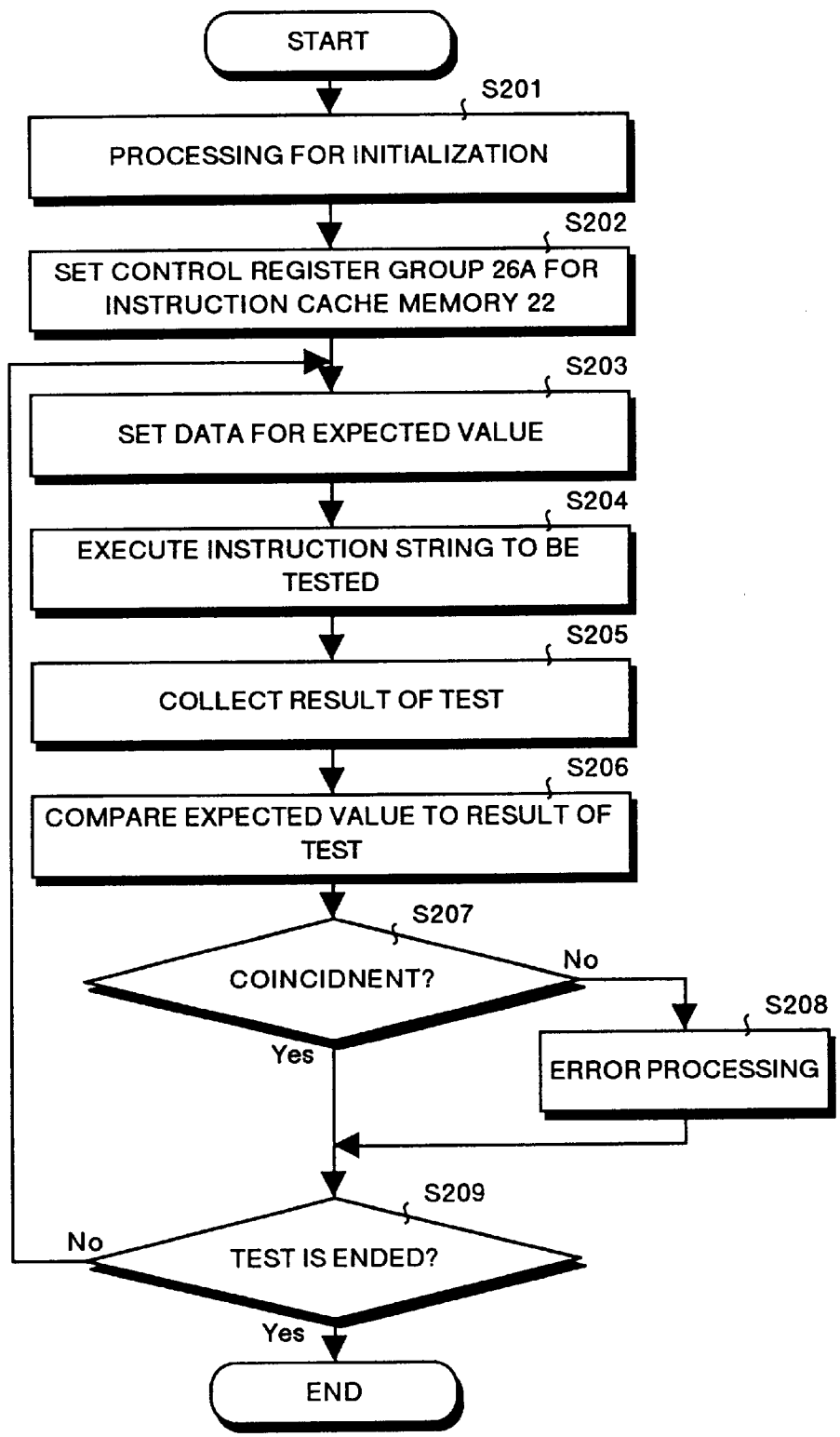
FIG. 4 is a flow chart for explaining operations of the apparatus according to Embodiment 2 of the present invention.

Next description is made for operations of the apparatus having the configuration as described above. FIG. 4 is a flow chart for explaining the operations of the apparatus according to Embodiment 2 of the present invention. At first, in the instruction control section 27, minimum initialization required for operation in the BI test is executed by the access instruction executing section 27A (step S201). At that time, an instruction string to be tested 272 is set therein. Then, in the BI control section 26, setting of the control register group 26A for BI control to the instruction cache memory 22 as a target is executed (step S202).

Namely, in the control register group 26A, instruction data for permitting input of a BI signal to the instruction cache memory 22 is stored in the BI signal transmission permission register 261, and type data indicating a type of the instruction cache memory 22 to which the BI signal is transmitted is stored in the BI signal type register 262.

Then, in the instruction control section 27, data for an expected value expected in the BI test is set in the comparison control section 27B (step S203), and the instruction string to be tested 272 having been set is executed (step S204) With the execution of the instruction string to be tested 272, the instruction and operand stored in the memory 25 are stored in the instruction cache memory 22 and operand cache memory 23 respectively via the intermediate buffer 24. In this case, in the BI control section 26, the BI signal transmitting section 26B issues BI signals many times to the instruction cache memory 22 because the instruction cache memory 22 is selected as a target. This BI signal is a signal for invalidation to certain access data on the memory 25.

Of the access data read out from the memory 25 by executing the instruction string to be tested 272, data for an instruction is set in the instruction cache memory 22 and data for an operand is set in the operand cache memory 23 each via the intermediate buffer 24. When the BI signal is outputted to the instruction cache memory 22 and if the access data on the memory 25 set as an object for invalidation in the BI signal is access data set in the instruction cache memory 22 by execution of the instruction string to be tested 272, the access data set in the instruction cache memory 22 is invalidated (BI). After executing the invalidation, a result of the test according to BI control is collected to the comparison control section 27B (step S205), and comparison is made between the result of the test and the expected value (step S206).

As a result, when it is found that they are coincident to each other (step S207) and the testis continued (step S209), the processing returns again to step S203 to execute the next step to the instruction string to be tested 272, but when they are not coincident to each other (step S207), error processing is executed using an informing unit such as a display (step S208), which is not shown in the figure, and when the test is continued, the processing returns again to step S203 (step S209). The operations from step S203 to step S208 are repeatedly executed until the test is ended (step S209).

As described above, with Embodiment 2, in the access instruction executing section 27A, an instruction string to be tested 272 for access to cache memories as an object for execution is previously prepared, access data on the memory 25 is set in the instruction cache memory 22 and operand cache memory 23 according to the instruction string to be tested 272, and in the BI control section 26, the access data set as described above is invalidated when the access data set in the instruction cache memory 22 is data for an address previously decided as an object for invalidation on the memory 25, and determination is made by the comparison control section 27B as to whether a result of invalidation is acceptable or not, so that, when the instruction cache memory 22 is decided to be a target for invalidation, verification can be executed even in such an earlier stage in which a smaller scale of logic simulation is performed without any support by an external unit, which allows work efficiency of the test on the whole to be improved.

In addition, only by setting an address of a BI signal to be transmitted to the instruction cache memory 22, a result of determination that invalidation was executed normally is obtained when a result of BI processing is coincident to an expected value previously prepared, and also a result of determination that invalidation was executed abnormally is obtained when the result of BI processing is not coincident to the expected value, so that the same test result as that obtained in the case where the test is executed with support by an external unit can simulatedly be obtained.

In Embodiments 1 and 2, the cache memories are targeted for the BI processing, but the intermediate buffer may be targeted for the BI processing as in Embodiment 3 described below.

Figure 5:
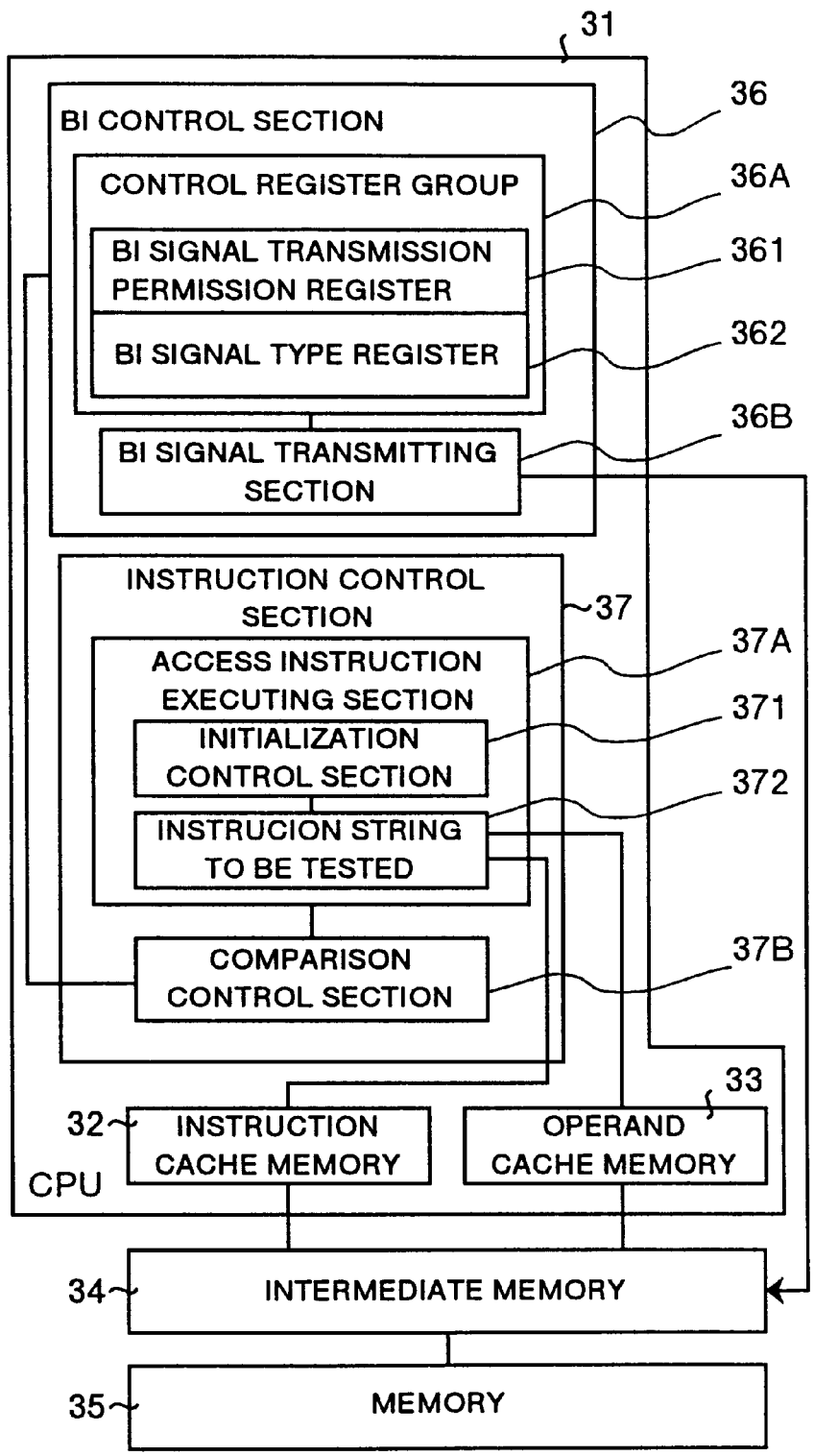
FIG. 5 is a block diagram showing a data processor testing apparatus according to Embodiment 3 of the present invention.

At first description is made for configuration of an apparatus. FIG. 5 is a block diagram showing a data processor testing apparatus according to Embodiment 3 of the present invention. The data processor testing apparatus shown in FIG. 5 comprises a CPU 31, an intermediate buffer 34, and a memory 35 for storing therein data. It is assumed that this data processor testing apparatus has a memory for a program required for executing a BI test, which is not shown in the figure.

The CPU 31 has an instruction cache memory 32 for storing therein instruction data (access data), an operand cache memory 33 for storing therein operand data (access data), a BI control section 36 for controlling BI signal transmission, and an instruction control section 37 for controlling the entire BI test or the like. The BI control section 36 has a control register group 36A comprising a BI signal transmission permission register 361 and a BI signal type register 362, and a BI signal transmitting section 36B.

In the control register group 36A, the BI signal transmission permission register 361 stores therein data for permitting input of a BI signal to a buffer namely to the intermediate buffer 34 as a target by means of BI control. The BI signal type register 362 stores therein data for instructing a type of an address to which a BI signal is transmitted (this case indicates the intermediate buffer 34). The BI signal transmitting section 36B connected to the intermediate buffer 34 generates a BI signal according to data set in the control register group 36A, and executes the processing for transmitting the BI signal to the intermediate buffer 34 as a target.

The instruction control section 37 comprises an access instruction executing section 37A for executing an instruction for access and a comparison control section 37B for comparing an expected value to a result of executing a BI test. The access instruction executing section 37A comprises an initialization control section 371 for initializing for a BI test with which access data is tested, and an instruction string to be tested 372 indicating a sequence of the BI test.

Connected to both the instruction cache memory 32 and the operand cache memory 33 are the instruction string to be tested 372 and the intermediate buffer 34 respectively, and an instruction and an operand are cached via the intermediate buffer 34 by execution of the instruction string to be tested 372 respectively. The intermediate buffer 34 is connected to the instruction cache memory 32, operand cache memory 33, and the memory 35, and stores therein any instruction and operand read out from the memory 35 by memory control as access data, outputs instruction data to the instruction cache memory 32, and also outputs operand data to the operand cache memory 33.

Figure 6:
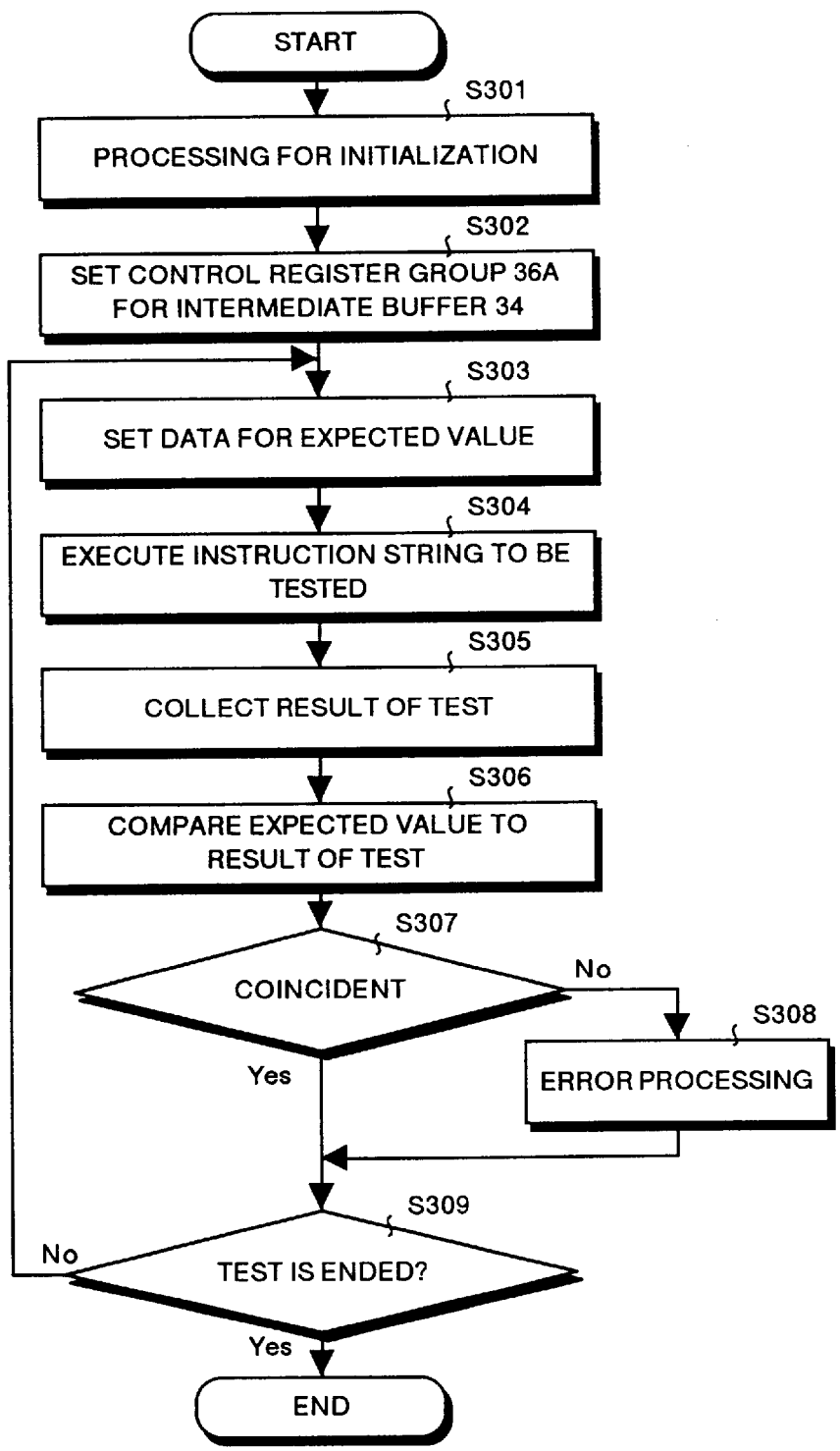
FIG. 6 is a flow chart for explaining operations of the apparatus according to Embodiment 3 of the present invention.

Next description is made for operations of the apparatus having the configuration as described above. FIG. 6 is a flow chart for explaining the operations of the apparatus according to Embodiment 3 of the present invention. At first, in the instruction control section 37, minimum initialization required for operation in the BI test is executed by the access instruction executing section 37A (step S301). At that time, an instruction string to be tested 372 is set therein. Then, in the BI control section 36, setting of the control register group 36A for BI control to the intermediate buffer 34 as a target is executed (step S302). Namely, in the control register group 36A, instruction data for permitting input of a BI signal to the intermediate buffer 34 is stored in the BI signal transmission permission register 361, and type data indicating a type of the intermediate buffer 34 to which the BI signal is transmitted is stored in the BI signal type register 362.

Then, in the instruction control section 37, data for an expected value expected in the BI test is set in the comparison control section 37B (step S303), and the instruction string to be tested 372 having been set is executed (step S304). With the execution of the instruction string to be tested 372, the instruction and operand stored in the memory 35 are stored in the instruction cache memory 32 and operand cache memory 33 respectively via the intermediate buffer 34. In this case, in the BI control section 36, the BI signal transmitting section 36B issues BI signals many times to the intermediate buffer 34 because the intermediate buffer 34 is selected as a target. This BI signal is a signal for invalidation to certain access data on the memory 35.

Of the access data read out from the memory 35 by executing the instruction string to be tested 372, data for an instruction is set in the instruction cache memory 32 and data for an operand is set in the operand cache memory 33 each via the intermediate buffer 34. When the BI signal is outputted to the intermediate buffer 34 and if the access data on the memory 35 set as an object for invalidation in the BI signal is access data set in the intermediate buffer 34 by execution of the instruction string to be tested 372, the access data set in the intermediate buffer 34 is invalidated (BI). After executing the invalidation, a result of the test according to BI control is collected to the comparison control section 37B (step S305), and comparison is made between the result of the test and the expected value (step S306).

As a result, when it is found that they are coincident to each other (step S307) and the testis continued (step S309), the processing returns again to step S303 to execute the next step to the instruction string to be tested 372, but when it is found that they are not coincident to each other (step S307), error processing is executed using an informing unit such as a display (step S308), which is not shown in the figure, and when the test is continued, the processing returns again to step S303 (step S309). The operations from step S303 to step S308 are repeatedly executed until the test is ended (step S309).

As described above, with Embodiment 3, in the access instruction executing section 37A, an instruction string to be tested 372 for access to a buffer as an object for execution is previously prepared, access data on the memory 35 is set in the intermediate buffer 34 according to the instruction string to be tested 372, and in the BI control section 36, the access data set as described above is invalidated when the access data set in the intermediate buffer 34 is data for an address previously decided as an object for invalidation on the memory 35, and determination is made by the comparison control section 37B as to whether a result of invalidation is acceptable or not, so that, when the intermediate buffer 34 is decided to be a target for invalidation, verification can be executed even in such an earlier stage in which a smaller scale of logic simulation is performed without any support by an external unit, which allows work efficiency of the test on the whole to be improved.

In addition, only by setting an address of a BI signal to be transmitted to the intermediate buffer 34, a result of determination that invalidation was executed normally is obtained when a result of BI processing is coincident to an expected value previously prepared, and also a result of determination that invalidation was executed abnormally is obtained when the result of BI processing is not coincident to the expected value, so that the same test result as that obtained in the case where the test is executed with support by an external unit can simulatedly be obtained.

In Embodiments 1, 2 and 3, the cache memories (the instruction cache memory and operand cache memory) or the intermediate buffer are targeted for the BI processing, but both the cache memories (the instruction cache memory and operand cache memory) and the intermediate buffer may be targeted for an BI processing as in Embodiment 4 described below. Especially, an BI address may be set either according to a certain rule or arbitrarily (variably), and description made hereinafter assumes a case where a BI address is set arbitrarily as an example.

Figure 7:
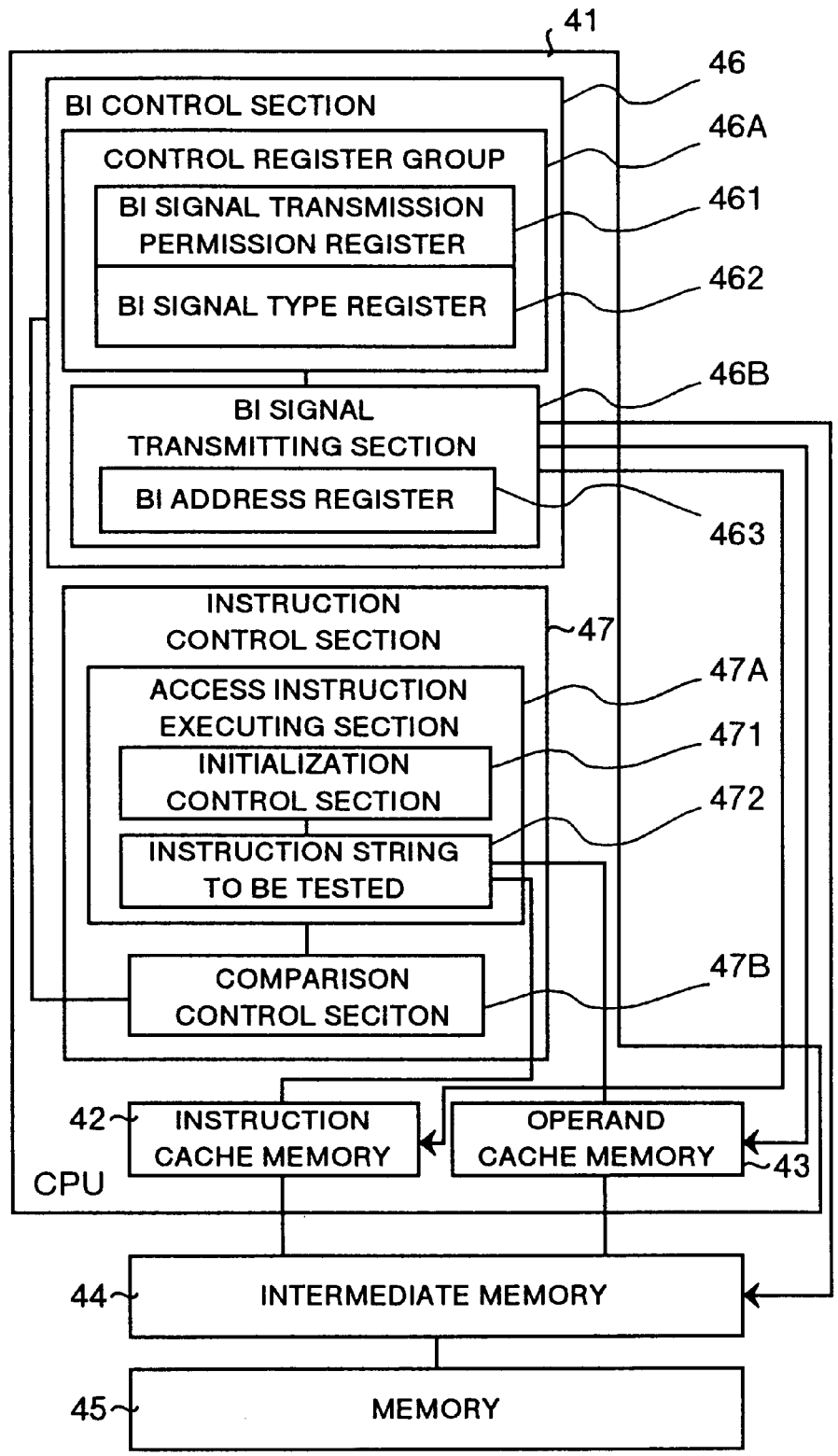
FIG. 7 is a block diagram showing a data processor testing apparatus according to Embodiment 4 of the present invention.

At first description is made for configuration of an apparatus. FIG. 7 is a block diagram showing a data processor testing apparatus according to Embodiment 4 of the present invention. The data processor testing apparatus shown in FIG. 7 comprises a CPU 41, an intermediate buffer 44, and a memory 45 for storing therein data. It is assumed that this data processor testing apparatus has a memory for a program required for executing a BI test, which is not shown in the figure.

The CPU 41 has an instruction cache memory 42 for storing therein instruction data (access data), an operand cache memory 43 for storing therein operand data (access data), a BI control section 46 for controlling BI signal transmission, and an instruction control section 47 for controlling the entire BI test or the like. The BI control section 46 has a control register group 46A comprising a BI signal transmission permission register 461 and a BI signal type register 462, and a BI signal transmitting section 46B.

In the control register group 46A, the BI signal transmission permission register 461 stores therein data for permitting input of BI signals to an instruction cache memory 42, an operand cache memory 43, and to an intermediate buffer 44 each as a target respectively by means of BI control. The BI signal type register 462 stores therein data for instructing a type of an address to which a BI signal is transmitted (this case indicates the instruction cache memory 42, operand cache memory 43, and intermediate buffer 44). The BI signal transmitting section 46B is connected to the instruction cache memory 42, operand cache memory 43 and to the intermediate buffer 44, generates BI signals according to data set in the control register group 46A, and executes the processing for transmitting the BI signals to the instruction cache memory 42, operand cache memory 43, and to the intermediate buffer 44 each as a target respectively.

In Embodiment 4, since an address of access data (on the memory 45) as an object for invalidation is set to be variable, a BI address register 463 is provided in the BI signal transmitting section 46B. This BI address register 463 stores therein arbitrary address data changed during BI testing.

The instruction control section 47 comprises an access instruction executing section 47A for executing an instruction for access and a comparison control section 47B for comparing an expected value to a result of executing a BI test. The access instruction executing section 47A comprises an initialization control section 471 for initializing for a BI test with which access data is tested, and an instruction string to be tested 472 indicating a sequence of the BI test.

Connected to both the instruction cache memory 42 and the operand cache memory 43 are the instruction string to be tested 472 and the intermediate buffer 44 respectively, and an instruction and an operand are cached via the intermediate buffer 44 by execution of the instruction string to be tested 472 respectively. The intermediate buffer 44 is connected to the instruction cache memory 42, operand cache memory 43, and to the memory 45, and stores therein any instruction and operand read out from the memory 45 by memory control as access data, outputs instruction data to the instruction cache memory 42, and also outputs operand data to the operand cache memory 43.

Figure 8:
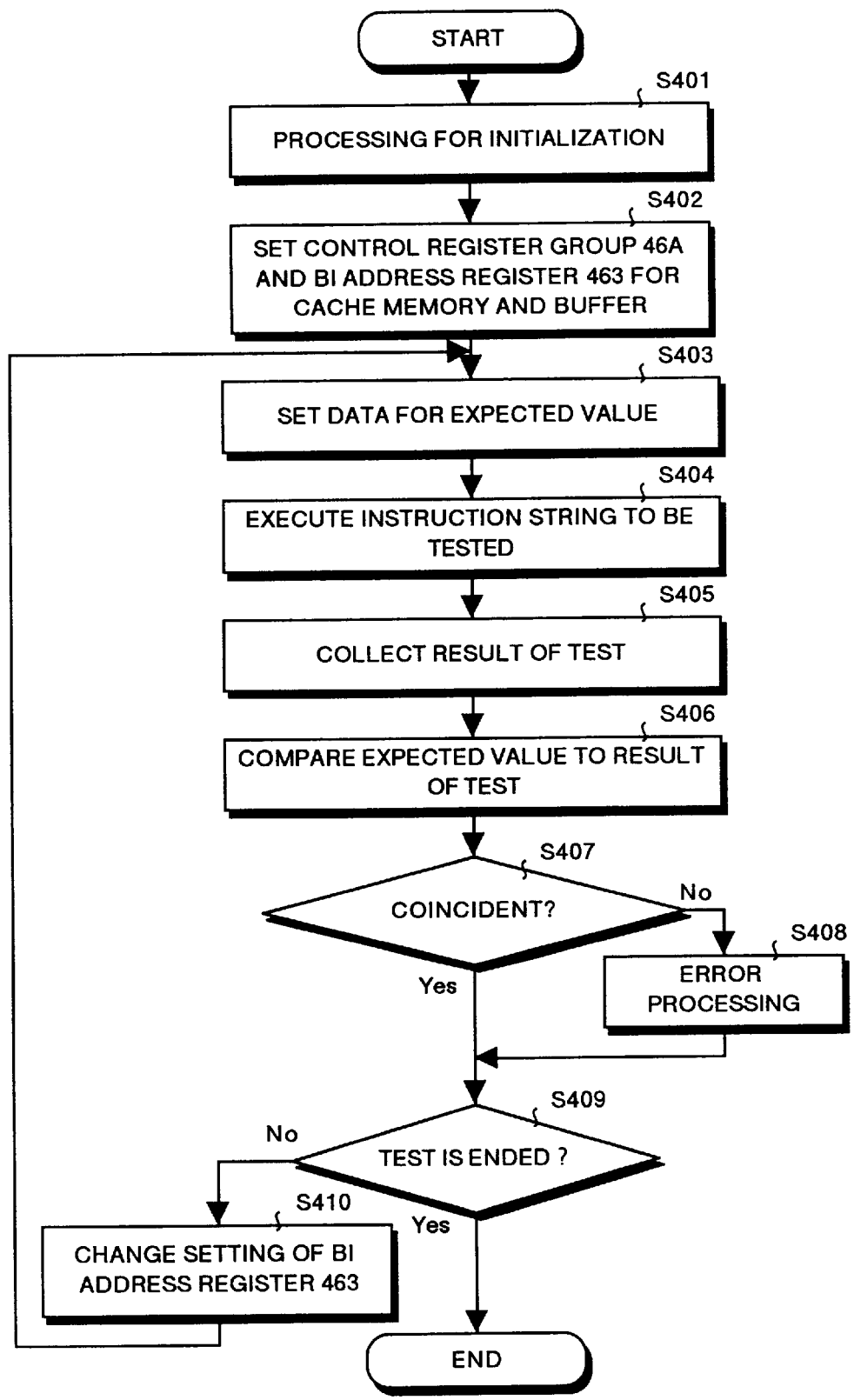
FIG. 8 is a flow chart for explaining operations of the apparatus according to Embodiment 4 of the present invention.

Next description is made for operations of the apparatus having the configuration as described above. FIG. 8 is a flow chart for explaining the operations of the apparatus according to Embodiment 4 of the present invention. At first, in the instruction control section 47, minimum initialization required for operation in the BI test is executed by the access instruction executing section 47A (step S401). At that time, an instruction string to be tested 472 is set therein. Then, in the BI control section 46, setting of the control register group 46A for BI control to the instruction cache memory 42, operand cache memory 43 and to the intermediate buffer 44 as targets, and setting of an initial BI address are executed (step S402).

At that time, in the control register group 46A, instruction data for permitting input of a BI signal to the instruction cache memory 42, operand cache memory 43 and to the intermediate buffer 44 is stored in the BI signal transmission permission register 461, and type data indicating a type of the instruction cache memory 42, operand cache memory 43 and of the intermediate buffer 44 to which the BI signals are transmitted is stored in the BI signal type register 462.

Then, in the instruction control section 47, data for an expected value expected in the BI test is set in the comparison control section 47B (step S403), and the instruction string to be tested 472 having been set is executed (step S404). With the execution of the instruction string to be tested 472, the instruction and operand stored in the memory 45 are stored in the instruction cache memory 42 and operand cache memory 43 respectively via the intermediate buffer 44. In this case, in the BI control section 46, the BI signal transmitting section 46B issues BI signals many times to the instruction cache memory 42, operand cache memory 43 and to the intermediate buffer 44 respectively because the instruction cache memory 42, operand cache memory 43, and intermediate buffer 44 are selected each as a target. This BI signal is a signal for invalidation to variable address data on the memory 45.

Of the access data read out from the memory 45 by executing the instruction string to be tested 472, data for an instruction is set in the instruction cache memory 42 and data for an operand is set in the operand cache memory 43 each via the intermediate buffer 44. When BI signals are outputted to the instruction cache memory 42, operand cache memory 43 and to the intermediate buffer 44 respectively, and if the address data (access data) on the memory 45 each set as an object for invalidation in the BI signal is access data set in the instruction cache memory 42, operand cache memory 43 and in the intermediate buffer 44 by execution of the instruction string to be tested 472, the access data set in the instruction cache memory 42, operand cache memory 43 and in the intermediate buffer 44 are invalidated (BI). After executing the invalidation, results of the tests according to BI control are collected to the comparison control section 47B (step S405), and comparison is made between the results of the tests and the expected value (step S406).

As a result, when it is found that they are coincident to each other (step S407) and the test is continued (step S409), the processing returns again to step S403 to execute the next step to the instruction string to be tested 472, but when it is found that they are not coincident to each other (step S407), error processing is executed using an informing unit such as a display (step S408), which is not shown in the figure, and when the test is continued, the processing returns again to step S403 (step S409). The operations from step S403 to step S408 are repeatedly executed until the test is ended (step S409).

However, when the processing returns from step S409 to step S403, BI address data are changed using random numbers or the like, and the changed BI address data is stored in the BI address register 463 as new address data on the memory 45 as an object for invalidation (step S410). For this reason, a different BI address is applied periodically (including the application each time) in the loop from step S403 to step S410.

As described above, with Embodiment 4, in the access instruction executing section 47A, an instruction string to be tested 472 for access to cache memories and a buffer as an object for execution is previously prepared, access data on the memory 45 is set in the instruction cache memory 42, operand cache memory 43 and in the intermediate buffer 44 according to the instruction string to be tested 472, and in the BI control section 46, the access data set as described above is invalidated when the access data set therein is data for a variable BI address as an object for invalidation on the memory 45, and determination is made by the comparison control section 47B as to whether a result of invalidation is acceptable or not, so that, when the instruction cache memory 42, operand cache memory 43 and intermediate buffer 44 are decided to be targets for invalidation using a variable BI address, verification can be executed even in such an earlier stage in which a smaller scale of logic simulation is performed without any support by an external unit, which allows work efficiency of the test on the whole to be improved.

In addition, by setting addresses of BI signals to be transmitted to the instruction cache memory 42, operand cache memory 43 and to the intermediate buffer 44, a result of determination that invalidation was executed normally is obtained when a result of BI processing is coincident to an expected value previously prepared, and also a result of determination that invalidation was executed abnormally is obtained when the result of BI processing is not coincident to the expected value, so that the same test result as that obtained in the case where the test is executed with support by an external unit can simulatedly be obtained.

In Embodiments 1, 2 and 3, the cache memories (the instruction cache memory and operand cache memory) or the intermediate buffer are targeted for the BI processing, but both the cache memories (the instruction cache memory and operand cache memory) and the intermediate buffer may be targeted for the BI processing as in Embodiment 5 described below. Especially, a timing of generating a BI signal may be set either according to a certain rule or variably, and description made hereinafter assumes a case where the timing of generating a BI signal is set to be variable as an example.

Figure 9:
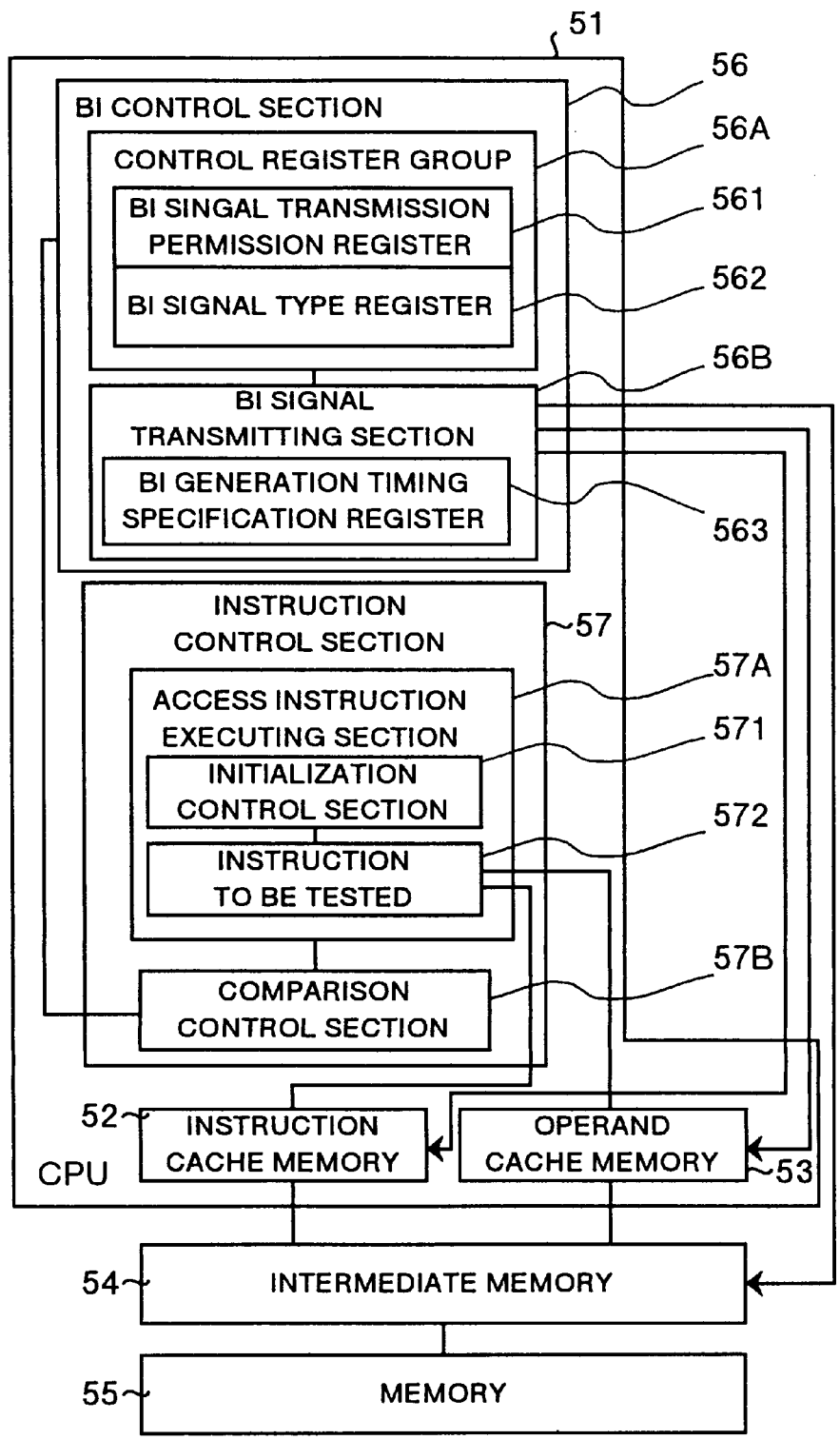
FIG. 9 is a block diagram showing a data processor testing apparatus according to Embodiment 5 of the present invention.

At first description is made for configuration of an apparatus. FIG. 9 is a block diagram showing a data processor testing apparatus according to Embodiment 5 of the present invention. The data processor testing apparatus shown in FIG. 9 comprises a CPU 51, an intermediate buffer 54, and a memory 55 for storing therein data. It is assumed that this data processor testing apparatus has a memory for a program required for executing a BI test, which is not shown in the figure.

The CPU 51 has an instruction cache memory 52 for storing therein instruction data (access data), an operand cache memory 53 for storing therein operand data (access data), a BI control section 56 for controlling BI signal transmission, and an instruction control section 57 for controlling the entire BI test or the like. The BI control section 56 has a control register group 56A comprising a BI signal transmission permission register 561 and a BI signal type register 562, and a BI signal transmitting section 56B.

In the control register group 56A, the BI signal transmission permission register 561 stores therein data for permitting input of BI signals to an instruction cache memory 52, an operand cache memory 53 and to an intermediate buffer 54 each as a target respectively by means of BI control. The BI signal type register 562 stores therein data for instructing a type of an address to which a BI signal is transmitted (this case indicates the instruction cache memory 52, operand cache memory 53, and intermediate buffer 54). The BI signal transmitting section 56B is connected to the instruction cache memory 52, operand cache memory 53 and to the intermediate buffer 54, generates BI signals according to data set in the control register group 56A, and executes the processing for transmitting the BI signals to the instruction cache memory 52, operand cache memory 53, and to the intermediate buffer 54 each as a target respectively.

In Embodiment 5, since a timing of generating a BI signal is set to be variable, a BI generation timing specification register 563 is provided in the BI signal transmitting section 56B. This BI generation timing specification register 563 stores therein timing data for specifying a variable timing of generating a BI signal.

The instruction control section 57 comprises an access instruction executing section 57A for executing an instruction for access and a comparison control section 57B for comparing an expected value to a result of executing a BI test. The access instruction executing section 57A comprises an initialization control section 571 for initializing for a BI test with which access data is tested, and an instruction string to be tested 572 indicating a sequence of the BI test.

Connected to both the instruction cache memory 52 and the operand cache memory 53 are the instruction string to be tested 572 and the intermediate buffer 54 respectively, and an instruction and an operand are cached via the intermediate buffer 54 by execution of the instruction string to be tested 572 respectively. The intermediate buffer 54 is connected to the instruction cache memory 52, operand cache memory 53, and to the memory 55, and stores therein any instruction and operand read out from the memory 55 by memory control as access data, outputs instruction data to the instruction cache memory 52, and also outputs operand data to the operand cache memory 53.

Figure 10:
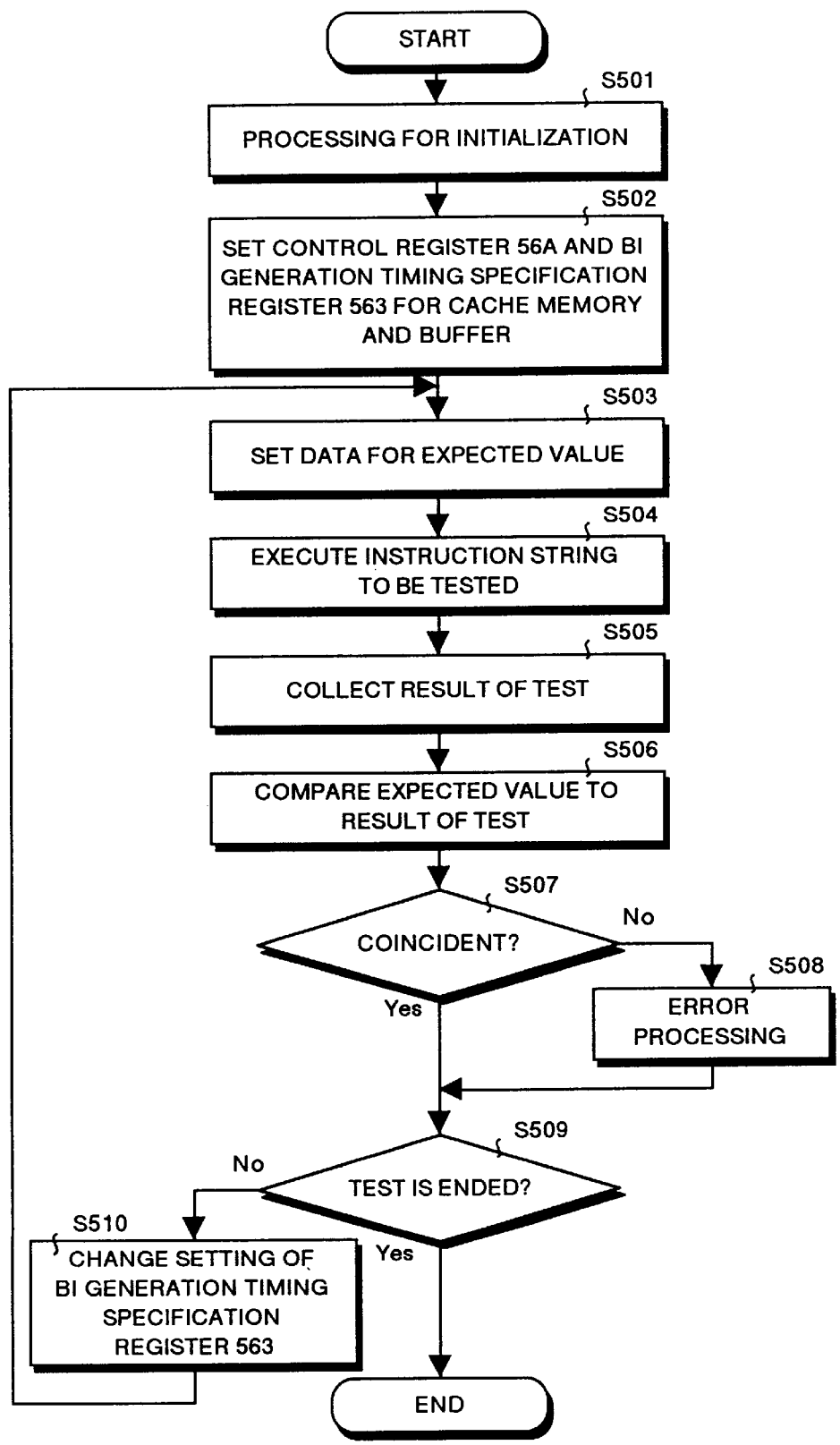
FIG. 10 is a flow chart for explaining operations of the apparatus according to Embodiment 5 of the present invention.

Next description is made for operations of the apparatus having the configuration as described above. FIG. 10 is a flow chart for explaining the operations of the apparatus according to Embodiment 5 of the present invention. At first, in the instruction control section 57, minimum initialization required for operation in the BI test is executed by the access instruction executing section 57A (step S501). At that time, an instruction string to be tested 572 is set therein. Then, in the BI control section 56, setting of the control register group 56A for BI control to the instruction cache memory 52, operand cache memory 53 and to the intermediate buffer 54 as targets, and setting of timing data for specifying an initial timing of generating a BI signal are executed (step S502).

At that time, in the control register group 56A, instruction data for permitting input of BI signals to the instruction cache memory 52, operand cache memory 53 and to the intermediate buffer 54 is stored in the BI signal transmission permission register 561, and type data indicating types of the instruction cache memory 52, operand cache memory 53, and of the intermediate buffer 54 to which the BI signals are transmitted is stored in the BI signal type register 562.

Then, in the instruction control section 57, data for an expected value expected in the BI test is set in the comparison control section 57B (step S503), and the instruction string to be tested 572 having been set is executed (step S504). With the execution of the instruction string to be tested 572, the instruction and operand stored in the memory 55 are stored in the instruction cache memory 52 and operand cache memory 53 respectively via the intermediate buffer 54.

In this case, in the BI control section 56, since the instruction cache memory 52, operand cache memory 53 and intermediate buffer 54 are selected each as a target, the BI signal transmitting section 56B issues BI signals many times to the instruction cache memory 52, operand cache memory 53, and to the intermediate buffer 54 respectively. This BI signal is a signal for invalidation to variable address data on the memory 55.

Of the access data read out from the memory 55 by executing the instruction string to be tested 572, data for an instruction is set in the instruction cache memory 52 and data for an operand is set in the operand cache memory 53 each via the intermediate buffer 54. When BI signals are outputted to the instruction cache memory 52, operand cache memory 53 and to the intermediate buffer 54 respectively, and if the address data (access data) on the memory 55 each set as an object for invalidation in the BI signal is access data set in the instruction cache memory 52, operand cache memory 53 and in the intermediate buffer 54 by execution of the instruction string to be tested 572, the access data set in the instruction cache memory 52, operand cache memory 53, and in the intermediate buffer 54 are invalidated (BI). After executing the invalidation, results of the tests according to BI control are collected to the comparison control section 57B (step S505), and comparison is made between the results of the tests and the expected value (step S506).

As a result, when it is found that they are coincident to each other (step S507) and the test is continued (step S509), the processing returns again to step S503 to execute the next step to the instruction string to be tested 572, but when it is found that they are not coincident to each other (step S507), error processing is executed using an informing unit such as a display (step S508), which is not shown in the figure, and when the test is continued, the processing returns again to step S503 (step S509). The operations from step S503 to step S508 are repeatedly executed until the test is ended (step S509).

However, when the processing returns from step S509 to step S503, a timing of generating a BI signal is changed using random numbers or the like, and the changed timing data is stored in the BI generation timing specification register 563 as new timing data for BI generation (step S510). For this reason, a different timing of generating a BI signal is applied periodically (including the application each time) in the loop from step S503 to step S510.

As described above, with Embodiment 5, in the access instruction executing section 57A, an instruction string to be tested 572 for access to cache memories and a buffer as an object for execution is previously prepared, access data on the memory 55 is set in the instruction cache memory 52, operand cache memory 53 and in the intermediate buffer 54 according to the instruction string to be tested 572, and in the BI control section 56, the access data set as described above is invalidated at a variable timing when the access data set in the instruction cache memory 52, operand cache memory 53 and in the intermediate buffer 54 is data for an address previously decided as an object for invalidation on the memory 55, and determination is made by the comparison control section 57B as to whether a result of invalidation is acceptable or not, so that, when the instruction cache memory 52, operand cache memory 53 and intermediate buffer 54 are decided to be targets for invalidation using a variable timing, verification can be executed even in such an earlier stage in which a smaller scale of logic simulation is performed without any support by an external unit, which allows work efficiency of the test on the whole to be improved.

In addition, by setting addresses of BI signals to be transmitted to the instruction cache memory 52, operand cache memory 53 and to the intermediate buffer 54, a result of determination that invalidation was executed normally is obtained when a result of BI processing is coincident to an expected value previously prepared, and also a result of determination that invalidation was executed abnormally is obtained when the result of BI processing is not coincident to the expected value, so that the same test result as that obtained in the case where the test is executed with support by an external unit can simulatedly be obtained.

In the present invention, the apparatuses according to Embodiments 4 and 5 may be combined as in Embodiment 6 described below. Namely, in Embodiment 6, BI signals are transmitted to cache memories and a buffer as targets, and description made hereinafter assumes a case where a BI address and a timing of generating a BI signal are set to be variable as an example.

Figure 11:
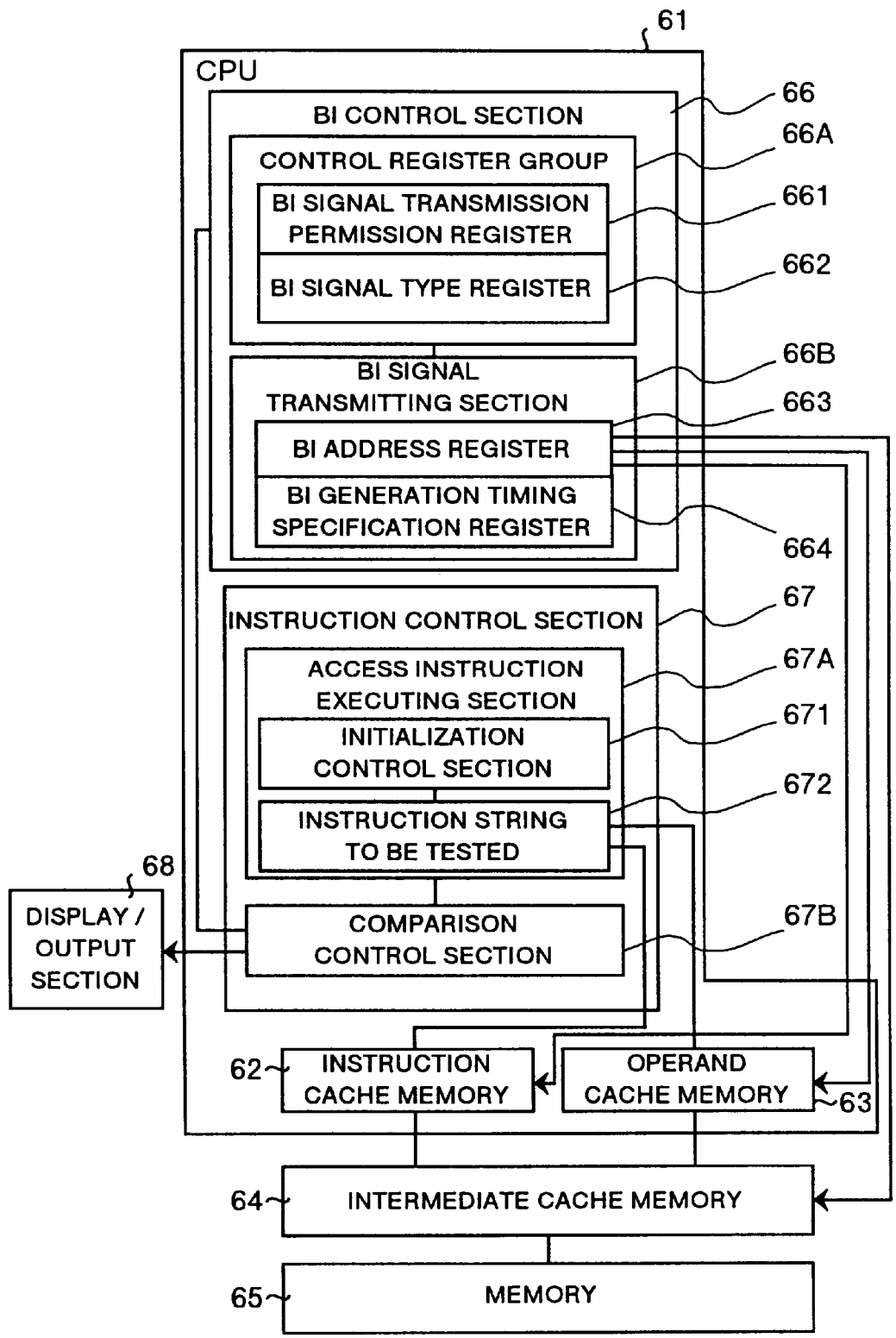
FIG. 11 is a block diagram showing a data processor testing apparatus according to Embodiment 6 of the present invention.

At first description is made for configuration of an apparatus. FIG. 11 is a block diagram showing a data processor testing apparatus according to Embodiment 6 of the present invention. The data processor testing apparatus shown in FIG. 11 comprises a CPU 61, an intermediate buffer 64, a memory 65 for storing therein data, and a display/output section 68. It is assumed that this data processor testing apparatus has a memory for a program required for executing a BI test, which is not shown in the figure.

The CPU 61 has an instruction cache memory 62 for storing therein instruction data (access data), an operand cache memory 63 for storing therein operand data (access data), a BI control section 66 for controlling BI signal transmission, and an instruction control section 67 for controlling the entire BI test or the like. The BI control section 66 has a control register group 66A comprising a BI signal transmission permission register 661 and a BI signal type register 662, and a BI signal transmitting section 66B.

In the control register group 66A, the BI signal transmission permission register 661 stores therein data for permitting input of BI signals to an instruction cache memory 62, an operand cache memory 63 and to an intermediate buffer 64 each as a target respectively by means of BI control. The BI signal type register 662 stores therein data for instructing a type of an address to which a BI signal is transmitted (this case indicates the instruction cache memory 62, operand cache memory 63, and intermediate buffer 64). The BI signal transmitting section 66B is connected to the instruction cache memory 62, operand cache memory 63 and to the intermediate buffer 64, generates BI signals according to data set in the control register group 66A, and executes the processing for transmitting the BI signals to the instruction cache memory 62, operand cache memory 63, and to the intermediate buffer 64 each as a target respectively.

In Embodiment 6, since not only a BI address but also a timing of generating a BI signal are set to be variable, a BI address register 663 and a BI generation timing specification register 664 are provided in the BI signal transmitting section 66B. The BI address register 663 has the same functions as those in the BI address register 463 used in Embodiment 4 and stores therein variable BI address data. The BI generation timing specification register 664 also has the same functions as those in the BI generation timing specification register 563 used in Embodiment 5 and stores therein timing data for specifying a variable timing of generating a BI signal.

The instruction control section 67 comprises an access instruction executing section 67A for executing an instruction for access and a comparison control section 67B for comparing an expected value to a result of executing a BI test. The display/output section 68 connected to an output terminal of the comparison control section 67B visually displays thereon data such as a result of comparison made in the comparison control section 67B, a BI address, and a timing of generating a BI signal. The access instruction executing section 67A comprises an initialization control section 671 for initializing for a BI test with which access data is tested, and an instruction string to be tested 672 indicating a sequence of the BI test.

Connected to both the instruction cache memory 62 and the operand cache memory 63 are the instruction string to be tested 672 and the intermediate buffer 64 respectively, and an instruction and an operand are cached via the intermediate buffer 64 by execution of the instruction string to be tested 672 respectively. The intermediate buffer 64 is connected to the instruction cache memory 62, operand cache memory 63, and to the memory 65, and stores therein any instruction and operand read out from the memory 65 by memory control as access data, outputs instruction data to the instruction cache memory 62, and also outputs operand data to the operand cache memory 63.

Figure 12:
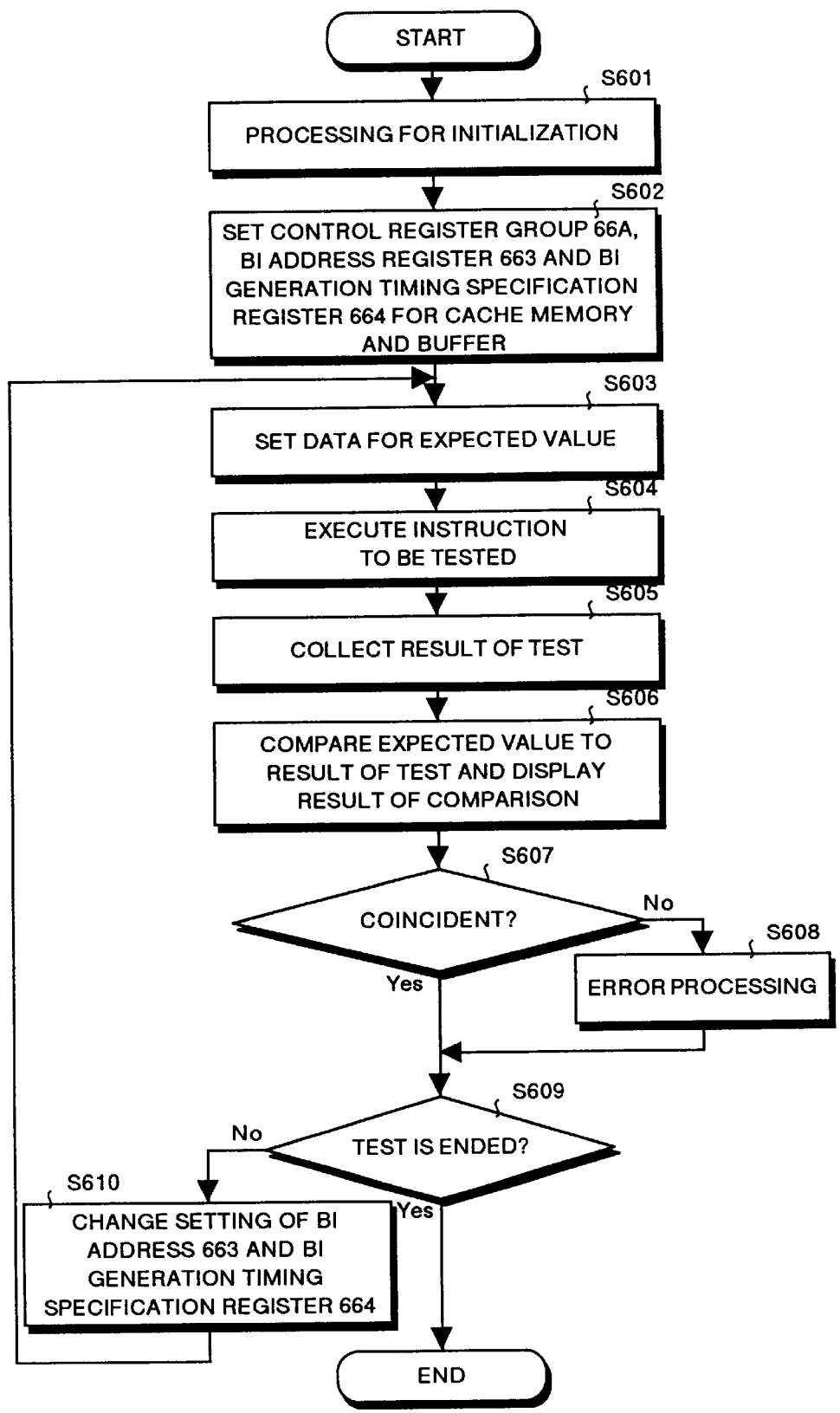
FIG. 12 is a flow chart for explaining operations of the apparatus according to Embodiment 6 of the present invention.

Next description is made for operations of the apparatus having the configuration as described above. FIG. 12 is a flow chart for explaining the operations of the apparatus according to Embodiment 6 of the present invention. At first, in the instruction control section 67, minimum initialization required for operation in the BI test is executed by the access instruction executing section 67A (step S601). At that time, an instruction string to be tested 672 is set therein. Then, in the BI control section 66, setting of the control register group 66A for BI control to the instruction cache memory 62, operand cache memory 63 and to the intermediate buffer 64 as targets is executed, and setting of initial BI address data as well as of timing data for specifying an initial timing of generating a BI signal are also executed (step S602).

At that time, in the control register group 66A, instruction data for permitting input of BI signals to the instruction cache memory 62, operand cache memory 63 and to the intermediate buffer 64 is stored in the BI signal transmission permission register 661, and type data indicating a type of the instruction cache memory 62, operand cache memory 63 and of the intermediate buffer 64 to which the BI signals are transmitted is stored in the BI signal type register 662.

Then, in the instruction control section 67, data for an expected value expected in the BI test is set in the comparison control section 67B (step S603), and the instruction string to be tested 672 having been set is executed (step S604). With the execution of the instruction string to be tested 672, the instruction and operand stored in the memory 65 are stored in the instruction cache memory 62 and operand cache memory 63 respectively via the intermediate buffer 64. In this case, in the BI control section 66, since the instruction cache memory 62, operand cache memory 63 and intermediate buffer 64 are selected each as a target, the BI signal transmitting section 66B issues BI signals many times to the instruction cache memory 62, operand cache memory 63, and to the intermediate buffer 64 respectively. This BI signal is a signal for invalidation to variable address data on the memory 65.

Of the access data read out from the memory 65 by executing the instruction string to be tested 672, data for an instruction is set in the instruction cache memory 62 and data for an operand is set in the operand cache memory 63 each via the intermediate buffer 64. When BI signals are outputted to the instruction cache memory 62, operand cache memory 63 and to the intermediate buffer 64 respectively, and if the access data on the memory 65 set as an object for invalidation in the BI signal is access data set in the instruction cache memory 62, operand cache memory 63 and in the intermediate buffer 64 by execution of the instruction string to be tested 672, the access data set in the instruction cache memory 62, operand cache memory 63, and in the intermediate buffer 64 are invalidated (BI). After executing the invalidation, results of the tests according to BI control are collected to the comparison control section 67B (step S605), and comparison is made between the results of the tests and the expected value. A result of comparison made therein, BI addresses, and timings of generating BI signals are visually displayed by the display/output section 68 (step S606). In the display, a result of the execution may be input in a matrix with the X and Y axes which comprises a relation between BI addresses and timings of generating BI signals.

As a result, when it is found that they are coincident to each other (step S607) and the test is continued (step S609), the processing returns again to step S603 to execute the next step to the instruction string to be tested 672, but when it is found that they are not coincident to each other (step S607), error processing is executed using an informing unit such as a display (step S608), which is not shown in the figure, and when the test is continued, the processing returns again to step S603 (step S609). The operations from step S603 to step S608 are repeatedly executed until the test is ended (step S609).

However, when the processing returns from step S609 to step S603, a BI address and a timing of generating a BI signal are changed using random numbers or the like, and the changed BI address and timing data are stored in the BI address register 663 and BI generation timing specification register 664 as new address data and timing data for BI generation (step S610) respectively. For this reason, a different BI address as well as timing of generating a BI signal are applied periodically (including the application each time) in the loop from step S603 to step S610.

As described above, with Embodiment 6, in the instruction control section 67, an instruction string to be tested 672 for access to cache memories and a buffer as an object for execution is previously prepared, access data on the memory 65 is set in the instruction cache memory 62, operand cache memory 63 and in the intermediate buffer 64 according to the instruction string to be tested 672, and in the BI control section 66, the access data set as described above is invalidated at a variable timing when the access data set in the instruction cache memory 62, operand cache memory 63 and the intermediate buffer 64 is data for variable BI addresses each as an object for invalidation on the memory 65, and determination is made by the comparison control section 67B as to whether a result of invalidation is acceptable or not, so that, when the instruction cache memory 62, operand cache memory 63 and intermediate buffer 64 are decided to be targets for invalidation using a variable BI address and a variable timing, verification can be executed even in such an earlier stage in which a smaller scale of logic simulation is performed without any support by an external unit, which allows work efficiency of the test on the whole to be improved.

In addition, by setting addresses of BI signals to be transmitted to the instruction cache memory 62, operand cache memory 63 and the intermediate buffer 64, a result of determination that invalidation was executed normally is obtained when a result of BI processing is coincident to an expected value previously prepared, and also a result of determination that invalidation was executed abnormally is obtained when the result of BI processing is not coincident to the expected value, so that the same test result as that obtained in the case where the test is executed with support by an external unit can simulatedly be obtained.

In Embodiments 4 to 6, the description has assumed the test executed in the state where the cache memories and the buffer are connected to each other as examples, but like in Embodiment 7 described below, the present invention may be applicable to a BI test in the state where the cache memories and the buffer are separated from each other.

Figure 13:
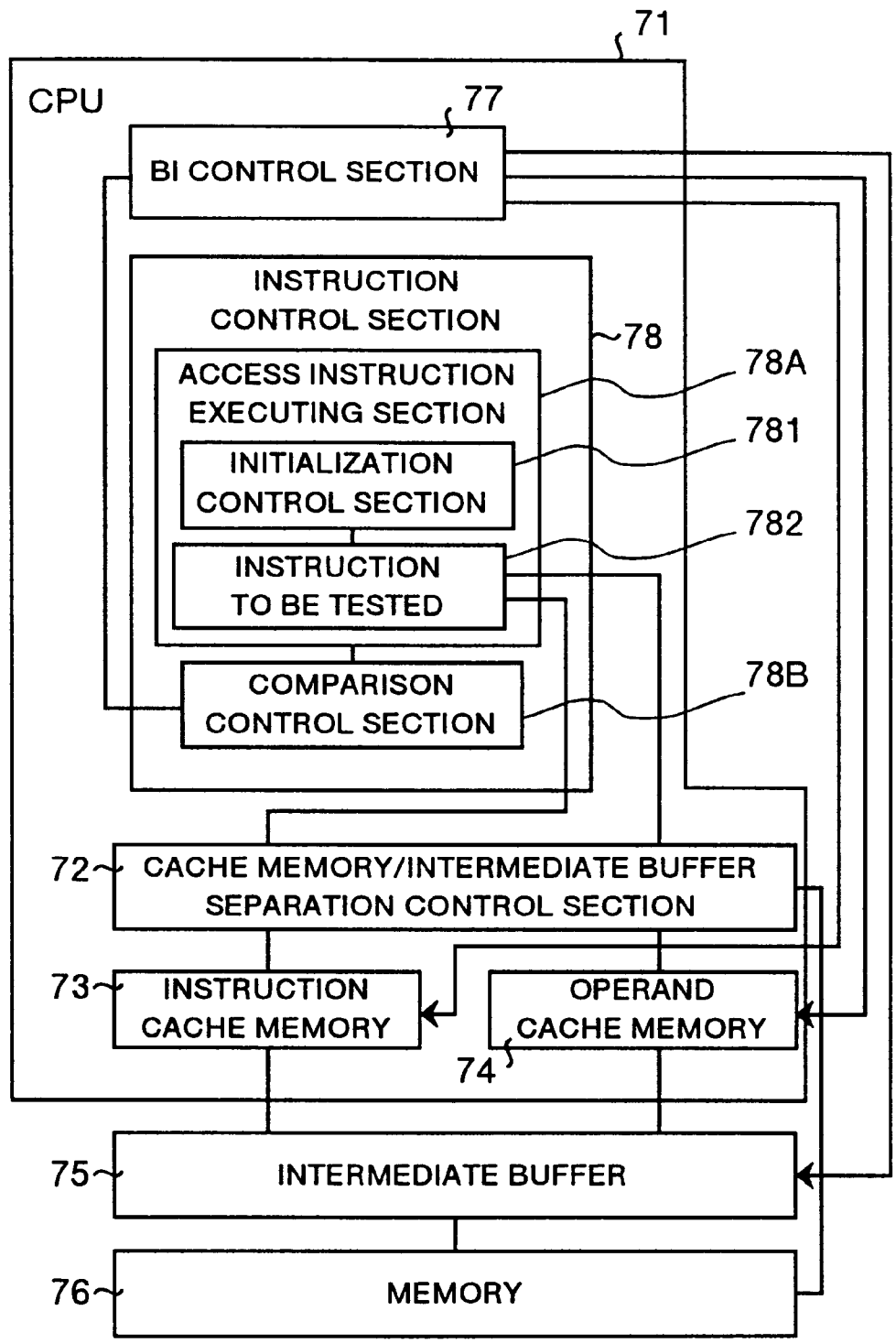
FIG. 13 is a block diagram showing a data processor testing apparatus according to Embodiment 7 of the present invention.

At first description is made for configuration of an apparatus. FIG. 13 is a block diagram showing a data processor testing apparatus according to Embodiment 7 of the present invention. The data processor testing apparatus shown in FIG. 13 comprises a CPU 71, an intermediate buffer 75, and a memory 76 for storing therein data. It is assumed that this data processor testing apparatus has a memory for a program required for executing a BI test, which is not shown in the figure.

The CPU 71 has a separation control section 72 for controlling separation of cache memories (instruction cache memory 73, operand cache memory 74) from an intermediate buffer 75, an instruction cache memory 73 for storing therein instruction data (access data), an operand cache memory 74 for storing therein operand data (access data), a BI control section 77 for controlling BI signal transmission, and an instruction control section 78 for controlling the entire BI test or the like. As it is assumed that the BI control section 77 has the same functions as those in each of the BI control sections according to Embodiment 4 (the changing method of BI addresses), Embodiment 5 (the changing method of timings of BI generation), or to Embodiment 6 (the changing method of BI addresses and timings of BI generation), description thereof is omitted herein. It should be noted that, in Embodiment 7, description assumes a case where a BI address or a timing of BI generation is set to be constant as an example.

The instruction control section 78 comprises an access instruction executing section 78A for executing an instruction for access and a comparison control section 78B for comparing an expected value to a result of executing the BI test. The access instruction executing section 78A comprises an initialization control section 781 for initializing for the BI test with which access data is tested, and an instruction string to be tested 782 indicating a sequence of the BI test.

Connected to both the instruction cache memory 73 and the operand cache memory 74 is the instruction string to be tested 782 each through the separation control section 72, and the intermediate buffer 75 is also connected to both of the cache memories. An instruction and an operand are cached via the intermediate buffer 75 by execution of the instruction string to be tested 782 respectively in the instruction cache memory 73 and operand cache memory 74. The intermediate buffer 75 is connected to the instruction cache memory 73, operand cache memory 74, and to the memory 76, and stores therein any instruction and operand read out from the memory 76 by memory control as access data, outputs instruction data to the instruction cache memory 73, and also outputs operand data to the operand cache memory 74. This intermediate buffer 75 and the cache memories (instruction cache memory 73 and operand cache memory 74) are separated from each other by means of control by the separation control section 72 when the BI test is performed.

Figure 14:
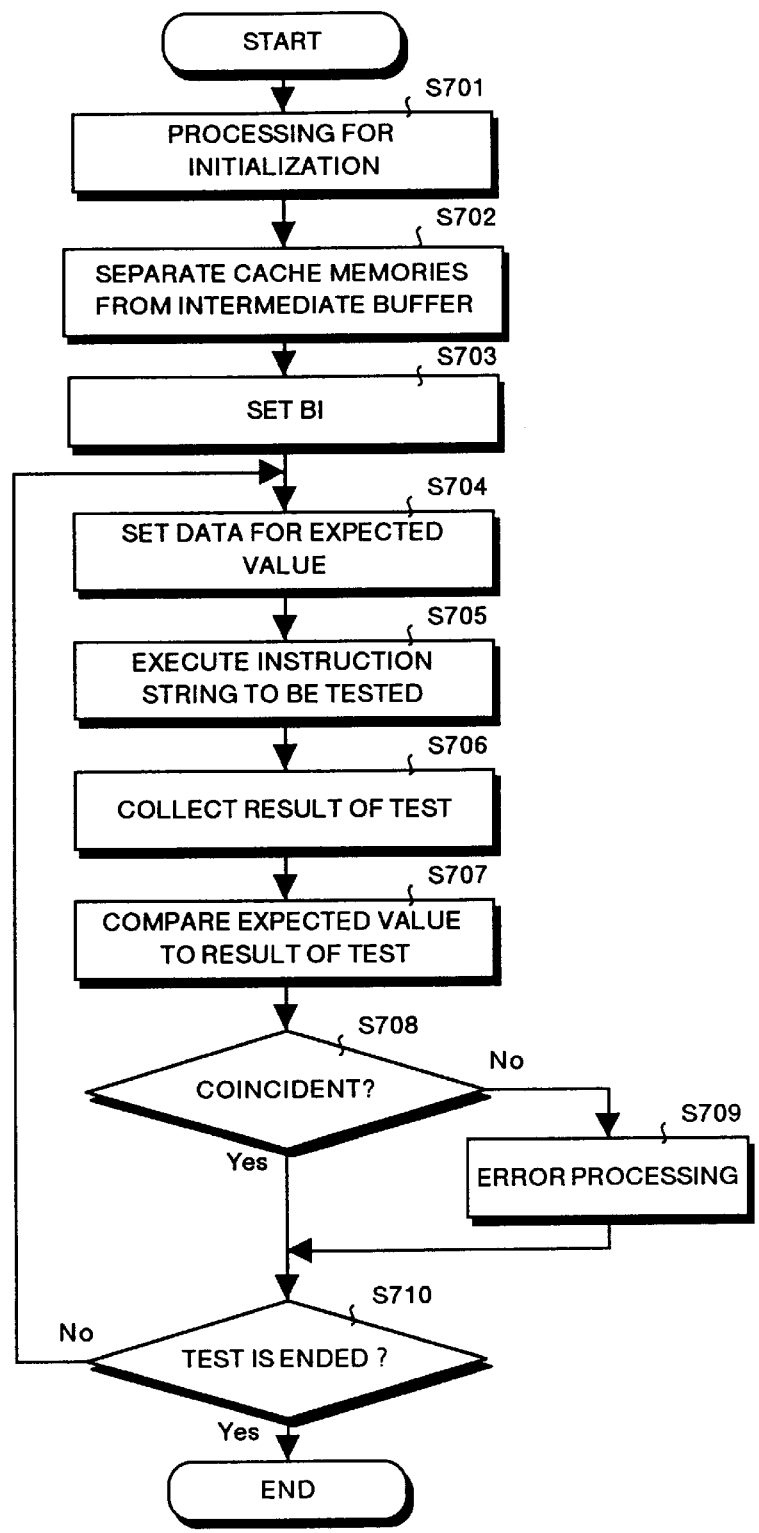
FIG. 14 is a flow chart for explaining operations of the apparatus according to Embodiment 7 of the present invention.
Figure 15:
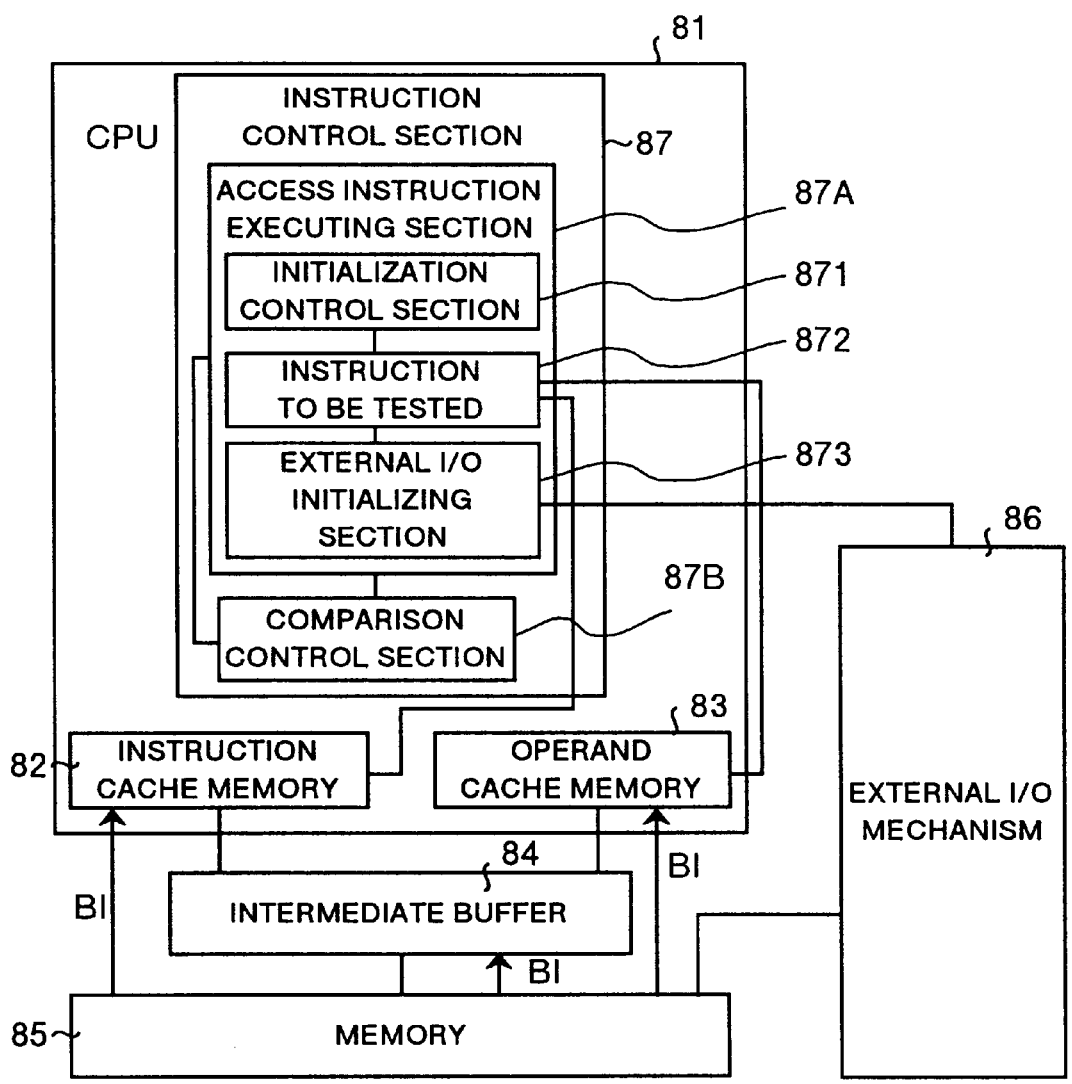
FIG. 15 is a block diagram showing the data processor testing apparatus according to the example based on the conventional technology.

Next description is made for operations of the apparatus having the configuration as described above. FIG. 14 is a flow chart for explaining the operations of the apparatus according to Embodiment 7 of the present invention. At first, in the instruction control section 78, minimum initialization required for operation in the BI test is executed by the access instruction executing section 78A (step S701). At that time, an instruction string to be tested 782 is set therein, data "00h", as one example, is written in an address No. A in the memory 76, and the data "00h" for the address No. A is written in the cache memories as access data. Further the cache memories and the intermediate buffer 75 are separated from each other by the separation control section 72, and then, the data for address No. A in the memory 76 is rewritten from "00h" to "FFh" (step S702). As a result, access data in the cache memories and access data on the memory 76 each in the same address are not coincident to each other.

Then, as in Embodiment 5 or Embodiment 6, in the BI control section 77, setting of a control register group (not shown in the figure) for BI control to the instruction cache memory 73, operand cache memory 74 and to the intermediate buffer 75 as targets is executed (step S703).

Then, in the instruction control section 78, data for an expected value expected in the BI test is set in the comparison control section 78B (step S704), and the instruction string to be tested 782 having been set is executed (step S705). With the execution of the instruction string to be tested 782, the instruction and operand originally stored in the memory 76 are stored in the instruction cache memory 73 and operand cache memory 74 respectively via the intermediate buffer 75. Since the cache memories and the intermediate buffer 75 are separated from each other, the access data read out from the memory 76 comes to the dead end in the intermediate buffer 75.

On the other hand, the BI control section 77 issues BI signals many times to the instruction cache memory 73, operand cache memory 74, and the intermediate buffer 75. When the BI signal is outputted to the cache memories, the access data "00h" on the cache memories is not coincident to the access data "FFh" in the address No. A on the memory 76 because of the separation control. Even under the situation as described above, if the access data on the memory 76 set as an object for invalidation in the BI signal is access data set in the cache memories in the execution of the instruction string to be tested 782, the access data set in the cache memories can be invalidated (BI). After executing the invalidation, a result of the test according to BI control is collected to the comparison control section 78B (step S706), and comparison is made between the result of the test and the expected value (step S707).

As a result, when it is found that they are coincident to each other (step S708) and the testis continued (step S710), the processing returns again to step S703 to execute the next step to the instruction string to be tested 782, but when it is found that they are not coincident to each other (step S708), error processing is executed using an informing unit such as a display (step S709), which is not shown in the figure, and when the test is continued, the processing returns again to step S704 (step S710). The operations from step S704 to step S709 are repeatedly executed until the test is ended (step S710).

As described above, with Embodiment 7, in the state where the instruction cache memory 73 and operand cache memory 74 are separated from the intermediate buffer 75 by the separation control section 72 after initialization is executed to the instruction cache memory 73, operand cache memory 74 and to the intermediate buffer 75, in the instruction control section 78, an instruction string to be tested 782 for access to cache memories and a buffer as an object for execution is previously prepared, access data on the memory 76 is set only in the intermediate buffer 75 according to the instruction string to be tested 782, and in the BI control section 77, the access data set as described above is invalidated when the access data set in the instruction cache memory 73, operand cache memory 74 and the intermediate buffer 75 is data for addresses each as an object for invalidation on the memory 76 after the execution of the instruction string to be tested 782, and determination is made by the comparison control section 78B as to whether a result of invalidation is acceptable or not, so that, when the instruction cache memory 73, operand cache memory 74 and intermediate buffer 75 are decided to be targets for invalidation, and even if invalidation is incapable of execution in the cache memories, verification can be executed even in such an earlier stage in which a smaller scale of logic simulation is performed without any support by an external unit, which allows work efficiency of the test on the whole to be improved.

In addition, by setting addresses of BI signals to be transmitted to the instruction cache memory 73, operand cache memory 74 and the intermediate buffer 75, a result of determination that invalidation was executed normally is obtained when a result of BI processing is coincident to an expected value previously prepared, and also a result of determination that invalidation was executed abnormally is obtained when the result of BI processing is not coincident to the expected value, so that the same test result as that obtained in the case where the test is executed with support by an external unit can simulatedly be obtained.

It is understood that the present invention is not restricted to Embodiments 1 to 7 and may be modified and realized in various ways without departing from the spirit and the scope of the present invention as hereinafter claimed.

As described above, with the data processor testing apparatus according to the present invention, access data on a first memory is read out and stored on a second memory according to the instruction string to be tested, the access data stored on the second memory is invalidated when the access data stored on the second memory is decided as an object for invalidation according to a certain rule or arbitrarily, and determination is made as to whether a result of the invalidation is acceptable or not, so that verification can be executed even in such an earlier stage in which a smaller scale of logic simulation is performed without any support by an external unit, whereby it is possible to obtain a data processor testing apparatus in which work efficiency of the test on the whole can be improved.

With the data processor testing apparatus according to the present invention, an instruction string to be tested for access to cache memories as an object for execution is previously prepared, access data on the memory is set in the instruction cache memory and operand cache memory according to the instruction string to be tested, the access data set as described above is invalidated when the access data set in the operand cache memory is data for an address previously decided as an object for invalidation on the memory, and determination is made as to whether a result of invalidation is acceptable or not, so that, when the operand cache memory is decided to be a target for invalidation, verification can be executed even in such an earlier stage in which a smaller scale of logic simulation is performed without any support by an external unit, whereby it is possible to obtain a data processor testing apparatus in which work efficiency of the test on the whole can be improved.

With the data processor testing apparatus according to the present invention, an instruction string to be tested for access to cache memories as an object for execution is previously prepared, access data on the memory is set in the instruction cache memory and operand cache memory according to the instruction string to be tested, the access data set as described above is invalidated when the access data set in the instruction cache memory is data for an address previously decided as an object for invalidation on the memory, and determination is made as to whether a result of invalidation is acceptable or not, so that, when the instruction cache memory is decided to be a target for invalidation, verification can be executed even in such an earlier stage in which a smaller scale of logic simulation is performed without any support by an external unit, whereby it is possible to obtain a data processor testing apparatus in which work efficiency of the test on the whole can be improved.

With the data processor testing apparatus according to the present invention, an instruction string to be tested for access to a buffer as an object for execution is previously prepared, access data on the memory is set in an intermediate buffer according to the instruction string to be tested, the access data set as described above is invalidated when the access data set in the intermediate buffer is data for an address previously decided as an object for invalidation on the memory, and determination is made as to whether a result of invalidation is acceptable or not, so that, when the intermediate buffer is decided to be a target for invalidation, verification can be executed even in such an earlier stage in which a smaller scale of logic simulation is performed without any support by an external unit, whereby it is possible to obtain a data processor testing apparatus in which work efficiency of the test on the whole can be improved.

With the data processor testing apparatus according to the present invention, an instruction string to be tested for access to cache memories as well as to a buffer as an object for execution is previously prepared, access data on the memory is set in an instruction cache memory, an operand cache memory and an intermediate buffer according to the instruction string to be tested, the set access data is invalidated when the set access data is data for an address decided as an object for invalidation on the memory according to a certain rule or arbitrarily, and determination is made as to whether a result of invalidation is acceptable or not, so that, when the instruction cache memory, operand cache memory, and intermediate buffer are decided to be targets for invalidation using a certain or arbitrary address, verification can be executed even in such an earlier stage in which a smaller scale of logic simulation is performed without any support by an external unit, whereby it is possible to obtain a data processor testing apparatus in which work efficiency of the test on the whole can be improved.

With the data processor testing apparatus according to the present invention, an instruction string to be tested for access to cache memories as well as to a buffer as an object for execution is previously prepared, access data on the memory is set in an instruction cache memory, an operand cache memory and an intermediate buffer according to the instruction string to be tested, the set access data is invalidated when the access data set in the instruction cache memory, operand cache memory and intermediate buffer is data for an address previously decided as an object for invalidation on the memory at the timing decided according to a certain rule or arbitrarily, and determination is made as to whether a result of invalidation is acceptable or not, so that, when the instruction cache memory, operand cache memory and intermediate buffer are decided to be targets for invalidation using a certain or an arbitrary timing, verification can be executed even in such an earlier stage in which a smaller scale of logic simulation is performed without any support by an external unit, whereby it is possible to obtain a data processor testing apparatus in which work efficiency of the test on the whole can be improved.

With the data processor testing apparatus according to the present invention, an instruction string to be tested for access to cache memories as well as to a buffer as an object for execution is previously prepared, access data on the memory is set in an instruction cache memory, an operand cache memory and an intermediate buffer according to the instruction string to be tested, the set access data is invalidated when the access data set in the instruction cache memory, operand cache memory and intermediate buffer is data for an address decided as an object for invalidation on the memory according to a certain rule or arbitrarily at the timing decided according to a certain rule or arbitrarily, and determination is made as to whether a result of invalidation is acceptable or not, so that, when the instruction cache memory, operand cache memory and intermediate buffer are decided to be targets for invalidation using a certain or arbitrary address and a certain or arbitrary timing, verification can be executed even in such an earlier stage in which a smaller scale of logic simulation is performed without any support by an external unit, whereby it is possible to obtain a data processor testing apparatus in which work efficiency of the test on the whole can be improved.

With the data processor testing apparatus according to the present invention, the memory is accessed at the initial state, access data is set in the intermediate buffer, instruction cache memory and operand cache memory, and an instruction string to be tested for access to the instruction cache memory, operand cache memory and intermediate buffer as an object for execution is previously prepared in the state where the instruction cache memory and operand cache memory have been separated from the intermediate buffer, the memory is accessed according to the instruction string to be tested, access data on the memory is set in the intermediate buffer, the access data set in the instruction cache memory, operand cache memory and intermediate buffer respectively is invalidated when the access data initialized in the instruction cache memory as well as in the operand cache memory and the access data set in the intermediate buffer with the instruction string to be tested are data for an address decided as an object for invalidation on the memory according to a certain rule or arbitrarily, and determination is made as to whether a result of invalidation is acceptable or not, so that, when the instruction cache memory, operand cache memory and intermediate buffer are decided to be targets for invalidation, and even if the invalidation is incapable of execution in the cache memories, verification can be executed even in such an earlier stage in which a smaller scale of logic simulation is performed without any support by an external unit, whereby it is possible to obtain a data processor testing apparatus in which work efficiency of the test on the whole can be improved.

With the data processor testing apparatus according to the present invention, a result of determination that invalidation was executed normally is obtained when a result of invalidation is coincident to an expected value previously prepared, and also a result of determination that invalidation was executed abnormally is obtained when the result of invalidation is not coincident to the expected value, so that it is possible to obtain a data processor testing apparatus in which the same test result as that obtained in a case where the test is executed with support by an external unit can simulatedly be obtained.

With the data processor testing method according to the present invention, the method comprises the steps of reading out access data on a first memory according to an instruction string to be tested, storing the data on a second memory, invalidating the access data stored on the second memory when the stored access data is decided as an object for invalidation according to a certain rule or arbitrarily, and determining whether a result of invalidation is acceptable or not, so that verification can be executed even in such an earlier stage in which a smaller scale of logic simulation is performed without any support by an external unit, whereby it is possible to obtain a data processor testing method in which work efficiency of the test on the whole can be improved.

This application is based on Japanese patent application No. HEI 9-201907 filed in the Japanese Patent Office on Jul. 28, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A data processor testing apparatus for executing an access conflict test by using a second memory for temporally storing access data read from a first memory comprising:

an access instruction executing unit in which an instruction string to be tested for access to access data in said first memory as an object for execution is previously prepared, said first memory is accessed according to said instruction string to be tested, and access data on said first memory is read out and stored in said second memory;

an invalidation control unit for invalidating the access data stored in said second memory when the access data stored in said second memory is determined by said access instruction executing unit as an object for invalidation according to a certain rule or arbitrarily; and a determining unit for determining whether a result of invalidation by said invalidation control unit is acceptable or not.

2. A data processor testing apparatus according to claim 1; wherein said determining unit obtains a result of determination that invalidation was executed normally when a result of invalidation by said invalidation control unit is coincident to an expected value previously prepared, and also obtains a result of determination that invalidation was executed abnormally when the result of invalidation by said invalidation control unit is not coincident to the expected value.

3. A data processor testing apparatus for executing an access conflict test using an instruction cache memory and an operand cache memory for storing therein instruction data and operand data on a memory as access data respectively comprising:

an access instruction executing unit in which an instruction string to be tested for access to said instruction cache memory as well as to said operand cache memory as an object for execution is previously prepared, said memory is accessed according to said instruction string to be tested and the access data on said memory is set in said instruction cache memory and in said operand cache memory;

an invalidation control unit for invalidating the access data set as described above when the access data set by said access instruction executing unit in said operand cache is data for an address previously decided as an object for invalidation on said memory; and a determining unit for determining whether a result of invalidation by said invalidation control unit is acceptable or not.

4. A data processor testing apparatus according to claim 3; wherein said determining unit obtains a result of determination that invalidation was executed normally when a result of invalidation by said invalidation control unit is coincident to an expected value previously prepared, and also obtains a result of determination that invalidation was executed abnormally when the result of invalidation by said invalidation control unit is not coincident to the expected value.

5. A data processor testing apparatus for executing an access conflict test using an instruction cache memory and an operand cache memory for storing therein instruction data and operand data on a memory as access data respectively comprising:

an access instruction executing unit in which an instruction string to be tested for access to said instruction cache memory as well as to said operand cache memory as an object for execution is previously prepared, said memory is accessed according to said instruction string to be tested and the access data on said memory is set in said instruction cache memory and in said operand cache memory;

an invalidation control unit for invalidating said set access data when the access data set by said access instruction executing unit in said instruction cache memory is data for an address previously decided as an object for invalidation on said memory; and a determining unit for determining whether a result of invalidation by said invalidation control unit is acceptable or not.

6. A data processor testing apparatus according to claim 5; wherein said determining unit obtains a result of determination that invalidation was executed normally when a result of invalidation by said invalidation control unit is coincident to an expected value previously prepared, and also obtains a result of determination that invalidation was executed abnormally when the result of invalidation by said invalidation control unit is not coincident to the expected value.

7. A data processor testing apparatus for executing an access conflict test using an instruction cache memory and an operand cache memory for storing therein via an intermediate buffer instruction data and operand data each on a memory as access data respectively comprising:

an access instruction executing unit in which an instruction string to be tested for access to said intermediate buffer as an object for execution is previously prepared, said memory is accessed according to said instruction string to be tested, and access data on said memory is set in said intermediate buffer;

an invalidation control unit for invalidating said set access data when the access data set by said access instruction executing unit in said intermediate buffer is data for an address previously decided as an object for invalidation on said memory; and a determining unit for determining whether a result of invalidation by said invalidation control unit is acceptable or not.

8. A data processor testing apparatus according to claim 7; wherein said determining unit obtains a result of determination that invalidation was executed normally when a result of invalidation by said invalidation control unit is coincident to an expected value previously prepared, and also obtains a result of determination that invalidation was executed abnormally when the result of invalidation by said invalidation control unit is not coincident to the expected value.

9. A data processor testing apparatus for executing an access conflict test using an instruction cache memory and an operand cache memory for storing therein via an intermediate buffer instruction data and operand data each on a memory as access data respectively comprising:

an access instruction executing unit in which an instruction string to be tested for access to said instruction cache memory, said operand cache memory, and said intermediate buffer as an object for execution is previously prepared, said memory is accessed according to said instruction string to be tested, and access data on said memory is set in said intermediate buffer, said instruction cache, and said operand cache respectively;

an address storing unit for deciding an address as an object for invalidation on said memory according to a certain rule or arbitrarily and storing therein the address;

an invalidation control unit for invalidating said set access data when the access data set by said access instruction executing unit in said intermediate buffer, said instruction cache memory, and said operand cache memory is data for an address stored in said address storing unit on said memory; and a determining unit for determining whether a result of invalidation by said invalidation control unit is acceptable or not.

10. A data processor testing apparatus according to claim 9; wherein said determining unit obtains a result of determination that invalidation was executed normally when a result of invalidation by said invalidation control unit is coincident to an expected value previously prepared, and also obtains a result of determination that invalidation was executed abnormally when the result of invalidation by said invalidation control unit is not coincident to the expected value.

11. A data processor testing apparatus for executing an access conflict test using an instruction cache memory and an operand cache memory for storing therein via an intermediate buffer instruction data and operand data each on a memory as access data respectively comprising:

an access instruction executing unit in which an instruction string to be tested for access to said instruction cache memory, said operand cache memory, and said intermediate buffer as an object for execution is previously prepared, said memory is accessed according to said instruction string to be tested, and access data on said memory is set in said intermediate buffer, said instruction cache memory, and said operand cache memory respectively;

a timing storing unit for deciding a timing for invalidating access data set by said access instruction executing unit according to a certain rule or arbitrarily and storing therein the timing;

an invalidation control unit for invalidating said set access data when the access data set by said access instruction executing unit in said intermediate buffer, said instruction cache memory, and said operand cache memory is data for an address previously decided on said memory at the timing stored in said timing storing unit; and a determining unit for determining whether a result of invalidation by said invalidation control unit is acceptable or not.

12. A data processor testing apparatus according to claim 11; wherein said determining unit obtains a result of determination that invalidation was executed normally when a result of invalidation by said invalidation control unit is coincident to an expected value previously prepared, and also obtains a result of determination that invalidation was executed abnormally when the result of invalidation by said invalidation control unit is not coincident to the expected value.

13. A data processor testing apparatus for executing an access conflict test using an instruction cache memory and an operand cache memory for storing therein via an intermediate buffer instruction data and operand data each on a memory as access data respectively comprising:

an access instruction executing unit in which an instruction string to be tested for access to said instruction cache memory, said operand cache memory, and said intermediate buffer as an object for execution is previously prepared, said memory is accessed according to said instruction string to be tested, and access data on said memory is set in said intermediate buffer, said instruction cache memory, and said operand cache memory respectively;

an address storing unit for deciding an address on said memory as an object for invalidation according to a certain rule or arbitrarily and storing therein the address;

a timing storing unit for deciding a timing for invalidating access data set by said access instruction executing unit according to a certain rule or arbitrarily and storing therein the timing;

an invalidation control unit for invalidating said set access data when the access data set by said access instruction executing unit in said intermediate buffer, said instruction cache memory, and said operand cache memory is data for an address on said memory stored in said address storing unit at the timing stored in said timing storing unit; and a determining unit for determining whether a result of invalidation by said invalidation control unit is acceptable or not.

14. A data processor testing apparatus according to claim 13; wherein said determining unit obtains a result of determination that invalidation was executed normally when a result of invalidation by said invalidation control unit is coincident to an expected value previously prepared, and also obtains a result of determination that invalidation was executed abnormally when the result of invalidation by said invalidation control unit is not coincident to the expected value.

15. A data processor testing apparatus for executing an access conflict test using an instruction cache memory and an operand cache memory for storing therein via an intermediate buffer instruction data and operand data each on a memory as access data respectively comprising:

an initializing unit for accessing said memory in the initial state and setting access data in said intermediate buffer, said instruction cache memory and said operand cache memory;

a separator for separating said instruction cache memory, and said operand cache memory from said intermediate buffer;

an access instruction executing unit in which an instruction string to be tested for access to said instruction cache memory, said operand cache memory, and said intermediate buffer is previously prepared as an object for execution, said memory is accessed according to said instruction to be tested, and access data on said memory is set in said intermediate buffer, in the state where said intermediate buffer, said instruction cache memory, and said operand cache memory have been separated by said serapator from each other;

an invalidation control unit for invalidating access data set in said instruction cache memory, said operand cache memory, and said intermediate buffer respectively when, in the state where said instruction cache memory, said operand cache memory, and said intermediate buffer have been separated by said separator from each other, the access data set by said initializing unit in said instruction cache memory, said operand cache memory and access data set by said access instruction executing means in said intermediate buffer are address data for an address decided on said memory according to a certain rule or arbitrarily as an object for invalidation; and a determining unit for determining whether a result of invalidation by said invalidation control unit is acceptable or not.

16. A data processor testing apparatus according to claim 15; wherein said determining unit obtains a result of determination that invalidation was executed normally when a result of invalidation by said invalidation control unit is coincident to an expected value previously prepared, and also obtains a result of determination that invalidation was executed abnormally when the result of invalidation by said invalidation control unit is not coincident to the expected value.

17. A data processor testing method for executing an access conflict test using a second memory for reading out and temporally storing therein access data on a first memory comprising:

a first step of previously preparing an instruction string to be tested for access to access data on said first memory as an object for execution, accessing said first memory according to said instruction string to be tested, and reading out the access data on said first memory and having the access data stored in said second memory;

a second step of invalidating the access data stored in said second memory when the access data stored in said second memory in said first step is decided as an object for invalidation according to a certain rule or arbitrarily; and a third step of determining whether a result of invalidation in said second step is acceptable or not.

* * * * *

UNITED STATES PATENT AND TRADEMARK OFFICE
CERTIFICATE OF CORRECTION

PATENT NO.: 6,032,270
DATED : February 29, 2000
INVENTOR(S): Takeshi FURUKAWA, et al.

It is certified that errors appear in the above-identified patent and that said Letters Patent is hereby corrected as shown below:

Col. 25, Claim 1, line 2, change "temporally" to --temporarily--.

Col. 29, Claim 15, line 22, change "serapator" to --separator--.

Col. 30, Claim 17, line 3, change "temporally" to --temporarily--.

Signed and Sealed this

Ninth Day of January, 2001

*Attest:*

Q. TODD DICKINSON

*Attesting Officer*   *Commissioner of Patents and Trademarks*